(12) United States Patent
Satoh

(10) Patent No.: US 6,351,258 B1
(45) Date of Patent: Feb. 26, 2002

(54) SWITCHER SYSTEM AND I/O SWITCHING METHOD

(75) Inventor: Kimiyasu Satoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/242,954

(22) PCT Filed: Jun. 30, 1998

(86) PCT No.: PCT/JP98/02928

§ 371 Date: Nov. 29, 1999

§ 102(e) Date: Nov. 29, 1999

(87) PCT Pub. No.: WO99/00974

PCT Pub. Date: Jan. 7, 1999

(30) Foreign Application Priority Data

| Jun. 30, 1997 | (JP) | 9-174831 |
| Jun. 30, 1997 | (JP) | 9-174832 |
| Jun. 30, 1997 | (JP) | 9-174833 |

(51) Int. Cl.[7] ............................. G09G 5/00; H04Q 1/00
(52) U.S. Cl. ............ 345/168; 340/825.79; 340/825.83; 340/2.1; 340/2.23; 340/2.26; 340/2.28; 348/705
(58) Field of Search .................... 345/168; 340/825.79, 340/825.8, 825.83, 825.85, 825.89, 2.1, 2.23, 2.26, 2.28; 348/705

(56) References Cited

U.S. PATENT DOCUMENTS 5,072,217 A * 12/1991 Georgiou et al. ...... 340/825.79
5,243,334 A * 9/1993 Georgiou et al. ...... 340/825.02
5,343,193 A * 8/1994 Shoda et al. ........... 340/825.79
5,686,905 A * 11/1997 Murata et al. .......... 340/825.79

FOREIGN PATENT DOCUMENTS

| JP | 7-264474 | 10/1995 |
| JP | 7-312723 | 11/1995 |
| JP | 9-107567 | 4/1997 |

* cited by examiner

Primary Examiner—Bipin Shalwala
Assistant Examiner—Jimmy H. Nguyen
(74) Attorney, Agent, or Firm—Frommer Lawrence & Haug LLP; William S. Frommer

(57) ABSTRACT

The present invention switches an input/output route for each signal, even if types of signals are increased, without installing additional switchers.

The present invention provides a matrix-shaped switcher, including a group of a plurality of cross-points at which a plurality of input lines and a plurality of output lines intersect with each other, for switching input/output routes by switching connections of the cross-points within a predetermined matrix range composed of a predetermined input lines and output lines within the pluralities of input lines and output lines, storage means for storing unused matrix range information indicative of unused input lines and output lines except for the predetermined matrix range within the plurality of input lines and the plurality of output lines, and selected matrix range information indicative of input lines and output lines selected from the unused matrix range, and control means for setting a new matrix range from the unused matrix range based on the unused matrix range information and the selected matrix range information.

6 Claims, 17 Drawing Sheets

| INPUT LINES || OUTPUT LINES ||
| TOP | END | TOP | END |
|---|---|---|---|
| IN1 | IN64 | OUT1 | OUT64 |
| IN101 | IN164 | OUT101 | OUT164 |
| IN201 | IN264 | OUT201 | OUT264 |

SET PHANTOM TABLE (PHANTOM:DESTINATION<SOURCE-LEVEL)
(G.PHANTOM NAME:NUMBER)

IN001 :OUT001 <IN001 -1   IN002 :OUT001 <IN002 -1
IN003 :OUT001 <IN003 -1   IN004 :OUT001 <IN004 -1
IN005 :OUT001 <IN005 -1   IN006 :OUT001 <IN006 -1
IN007 :OUT001 <IN007 -1   IN008 :OUT001 <IN008 -1

SET ROUTE (ROUTE DESTINATION:DESTINATION<SOURCE-LEVEL)

OUT001 :OUT100 <IN100 -1 .......:.......<.......-.
.......:.......<.......-.   .......:.......<.......-.
.......:.......<.......-.   .......:.......<.......-.

A

SET PANEL TABLE(SOURCE)  CONTROL DESTINATION = OUT100

| | | | |
|---|---|---|---|
| 01 KEY=IN001 | 02 KEY=IN002 | 03 KEY=IN003 | 04 KEY=IN004 |
| 05 KEY=IN005 | 06 KEY=IN006 | 07 KEY=IN007 | 08 KEY=IN008 |
| 09 KEY=IN101 | 10 KEY=IN102 | 11 KEY=IN103 | 12 KEY=IN104 |
| 13 KEY=IN105 | 14 KEY=IN106 | 15 KEY=IN107 | 16 KEY=IN108 |

B

SET PANEL TABLE(DESTINATION)

| | | | |
|---|---|---|---|
| 01 KEY=…… | 02 KEY=…… | 03 KEY=…… | 04 KEY=…… |
| 05 KEY=…… | 06 KEY=…… | 07 KEY=…… | 08 KEY=…… |
| 09 KEY=…… | 10 KEY=…… | 11 KEY=…… | 12 KEY=…… |
| 13 KEY=…… | 14 KEY=…… | 15 KEY=…… | 16 KEY=…… |

FIG. 15

SWITCHER SYSTEM AND I/O SWITCHING METHOD

TECHNICAL FIELD

The present invention relates to a switcher apparatus and an input/output switching method which are suitable for application in a routing switch for switching signal inputs from a VTR (Video Tape Recorder), a video camera and so on to deliver to a desired signal output destination, for example, in a broadcasting station.

BACKGROUND ART

Conventionally, routing switches have been provided in broadcasting stations and so on to control switching of input/output routes for signals. After video signals and audio signals from signal sources have been fetched through arbitrary input lines, they are outputted through specified arbitrary output lines to respective receiving units on the editor side, such that editing operations on the video signals and the audio signals are performed in the respective receiving units.

More specifically, the routing switch is a matrix-shaped input/output switching apparatus, formed of a collection of cross-points, at which input lines and output lines intersect with each other, in order to deliver external video signals and audio signals from arbitrary input lines to arbitrary output lines. By setting an input line for each of columns in the matrix and setting an output line for each of rows, an input signal on a specified input line is outputted from the specified output line through a specified cross-point.

As illustrated in FIG. 20, in routing switchers $R_1$–$R_x$, input lines $S_1$–$S_n$ on the IN side and output lines $D_1$–$D_n$ on the OUT side are arranged in a matrix form, such that signals are outputted from specified input lines to specified output lines respectively through cross-points at which the input lines $S_1$–$S_n$ and the output lines $D_1$–$D_n$ intersect with each other.

More specifically, when the routing switchers $R_1$–$R_x$ receive a switching request for outputting a signal, for example, from a selected arbitrary input line $S_m$ to an arbitrary output line $D_m$, they output a signal inputted from the input line $S_m$ from the output line $D_m$ through a cross-point C1 on the shortest route therebetween.

Also, the routing switchers $R_1$–$R_x$ are not only capable of outputting a signal from a single output line Dm, but also simultaneously outputting signals through a maximum of n output lines D arbitrarily selected from the plurality of output lines $D_1$–$D_n$, thus providing a versatility which enables arbitrary signals to be outputted simultaneously from all of the output lines $D_1$–$D_n$ or only from specified predetermined output lines D.

When many types of signals are handled simultaneously, the number of routing switchers $R_1$–$R_x$ corresponding to the respective signals (in this case, the number is X) are required. For example, the types of signals required to record a video by a VTR may include a video signal, audio signals (R and L), a time code, a remote control signal, and so on, all of which are collectively referred to as the level.

In other words, the level refers to a layer structure, useful when input/output routes are to be switched for signals, for assigning respective signals to the same matrix range present on the matrix areas of the respective routing switches $R_1$–$R_x$ such that a plurality of types of signals associated with a single VTR are simultaneously switched or only particular types of signals are switched.

Therefore, when the user actually switches a signal input/output route, the user may specify the address of a cross-point to be switched, and the level (type of signal) to switch to a signal input/output route passing through the specified cross-point in a routing switcher R of the specified level.

In this event, although the number of levels exist corresponding to the number (X) of routing switchers $R_1$–$R_x$ (i.e., input/output routes can be switched for each of the X levels), a video signal and audio signals (L and R) include a digital domain and an analog domain, and the respective levels also include a time code, a variety of remote control signals, and so on, so that the number X of routing switchers R may not occasionally support respective signals sufficiently for actually handling a plurality of types of signals associated with a single VTR. In addition, when types of signals are increased, it is a matter of course that X levels become insufficient as the case may be.

In such a case, when only X routing switchers $R_1$–$R_x$ are available, it would be physically impossible to handle more than X types of signals to switch a signal input/output route for each of more than X types of levels. Therefore, for controlling signal input/output routes on respective levels in spite of an increase in the type of signals, a problem arises in that a number of routing switchers R must be newly installed corresponding to the types (levels) of signals.

In the routing switcher R, when an arbitrary input line is selected for a particular output line to be controlled, the names of input lines on the input side are all displayed in order on a predetermined display unit.

When the names of all input lines (line numbers) are thus displayed for an output line to be controlled upon selecting an input line, even input lines not available, for example, are also displayed on the input side, thereby forcing the user to make an unnecessary search for selecting an input line. This may lead to a fear that the user selects and sets an unavailable input line for a particular output line.

While it is also contemplated to display the names of all input lines (line numbers) available for setting for each of output lines, the names of input lines available for setting must be stored corresponding to each of output lines, implying a problem that the number of set data to be stored is increased to cause an increase in the amount of data to be stored.

On the other hand, if the routing switcher R is extended by cascade connecting (serially connecting) input lines or output lines, for example, if a similar routing switcher is cascade connected thereto through respective output lines, new output lines are connected in a one-to-one corresponding relationship with the original output lines, thereby resulting in twice extended input lines.

In this case, a combination of the routing switcher on the main body side and the routing switcher on the extension side constitutes a single routing switcher as a whole, wherein a new control panel must be installed for the routing switcher on the extension side for setting signal input/output routes, thus requiring two control panels on the main body side and on the extension side to control respective inputs and outputs.

On the other hand, if input lines in the routing switcher R are extended by connecting the routing switcher R on the main body side to a routing switcher on the extension side, for example, through a single bus, instead of cascade connection, a new control panel must be again installed for the routing switcher on the extension side for setting signal input/output routes through the extended routing switcher, thus requiring two control panels on the main body side and on the extension side to control respective inputs and outputs.

However, the extended routing switcher incurs complicated monitoring for input states due to the increased control panels, thereby making it difficult for the user to correctly ascertain input/output route setting situations. Also, since input lines and output lines must be set through the routing switchers on the extension side as well as on the main body side, thus causing a problem that the user is forced to perform complicated operations.

DISCLOSURE OF THE INVENTION

The present invention has been made in view of the aspects mentioned above, and is to propose a switcher apparatus and an input/output switching method which are capable of readily and rapidly switching and controlling each input/output route for each type of signal without installing a new switcher, even if types of signals are increased.

To solve the challenge mentioned above, the present invention provides a switcher apparatus comprising a matrix-shaped switcher, including a group of a plurality of cross-points at which a plurality of input lines and a plurality of output lines intersect with each other, for switching an input/output route for a signal by switching a connection of the cross-point within a predetermined matrix range composed of a predetermined input lines and output lines within the pluralities of input lines and output lines, storage means for storing unused matrix range information indicative of unused input lines and output lines except for the predetermined matrix range within the plurality of input lines and the plurality of output lines, and selected matrix range information indicative of input lines and output lines selected from the unused matrix range, and control means for setting a new matrix range from the unused matrix range based on the unused matrix range information and the selected matrix range information.

According to the present invention, by setting a new matrix range for switching an input/output route for a new signal from the unused matrix range of the switcher, it is possible to realize a switcher apparatus which is capable of controlling the switching of an input/output route for each type of signals, as long as there are a number of types of signals equal to or more than an integer multiple of the number of switchers, without installing additional switchers.

Also, the present invention provides an input/output switching method for switching an input/output route for a signal in a matrix-shaped switcher, including a group of a plurality of cross-points at which a plurality of input lines and a plurality of output lines intersect with each other, by switching connections of the cross-points within a predetermined matrix range composed of a predetermined input lines and output lines within the pluralities of input lines and output lines, wherein the method comprises a first step of reading from storage means unused matrix range information indicative of unused input lines and output lines except for the predetermined matrix range within the plurality of input lines and the plurality of output lines, and selected matrix range information indicative of selected input lines and output lines selected from the unused matrix range, and a second step of setting a new matrix range from the unused matrix range based on the unused matrix range information and the selected matrix range information.

According to the present invention, by setting a new matrix range for switching an input/output route for a new signal from the unused matrix range of the switcher, it is possible to realize an input/output switching method which is capable of controlling the switching of input/output routes for each type of signals, as long as there are a number of types of signals equal to or more than an integer multiple of the number of switchers, without installing additional switchers.

The present invention further provides a switcher apparatus for switching a signal route for a signal inputted from a single or a plurality of input lines to a desired output line from a single or a plurality of output lines, comprising an input/output range setting unit for setting a use range for the output lines, and for setting a use range for the input lines which are limited its use for the use range for the output lines, and a signal route setting unit for displaying the input lines, which have been limited its use for the output line, based on the use range of the input lines for the use range of the output lines, and for switching to the input lines which have been limited its use for the predetermined output line.

According to the present invention, by setting an input line range available to a predetermined output line by the input/output range setting unit, only available input lines can be displayed on a display unit of the input/output route setting unit when an input line is to be set for an output line to be controlled, thereby making it possible to realize a switcher apparatus which is capable of reliably and rapidly setting an input line for an output line to be controlled only with manipulations of selecting a desired input line from displayed available input lines.

The present invention further provides a switcher apparatus for switching a signal route for a signal inputted from a single or a plurality of input lines to a desired output line from a single or a plurality of output lines, comprising a main switcher having a single or a plurality of input lines and a single or a plurality of output lines, an extended switcher having a single or a plurality of input lines and a single or a plurality of output lines for extending the input lines and/or the output lines of the main switcher, a connection bus for connecting the extended switcher to the main switcher, a setting unit for setting a connection state of the extended switcher to the main switcher, and a switching control unit for switching a signal route in the main switcher and the extended switcher in accordance with the connection state.

According to the present invention, the input line and/or the output line of the main switcher is connected to the input line and/or the output line of the extended switcher through the connection bus for extension, and signal routes in the main switcher and the extended switcher are switched in accordance with connection states of the set main switcher and extended switcher, thereby making it possible to realize a switcher apparatus which is capable of selecting a desired input line and/or an output line not only in the main switcher but also in the extended switcher to control switching to a desired signal route.

BRIEF DESCRIPTION OF DRAWINGS

FIG. 15A and FIG. 15B are schematic diagrams used for explaining how input/output routes are set;

BEST MODE FOR CARRYING OUT THE INVENTION

Embodiments of the present invention will hereinafter be described in detail with reference to the drawings.

(1) First Embodiment (1-1) General Configuration of Switcher Apparatus

Figure 1:
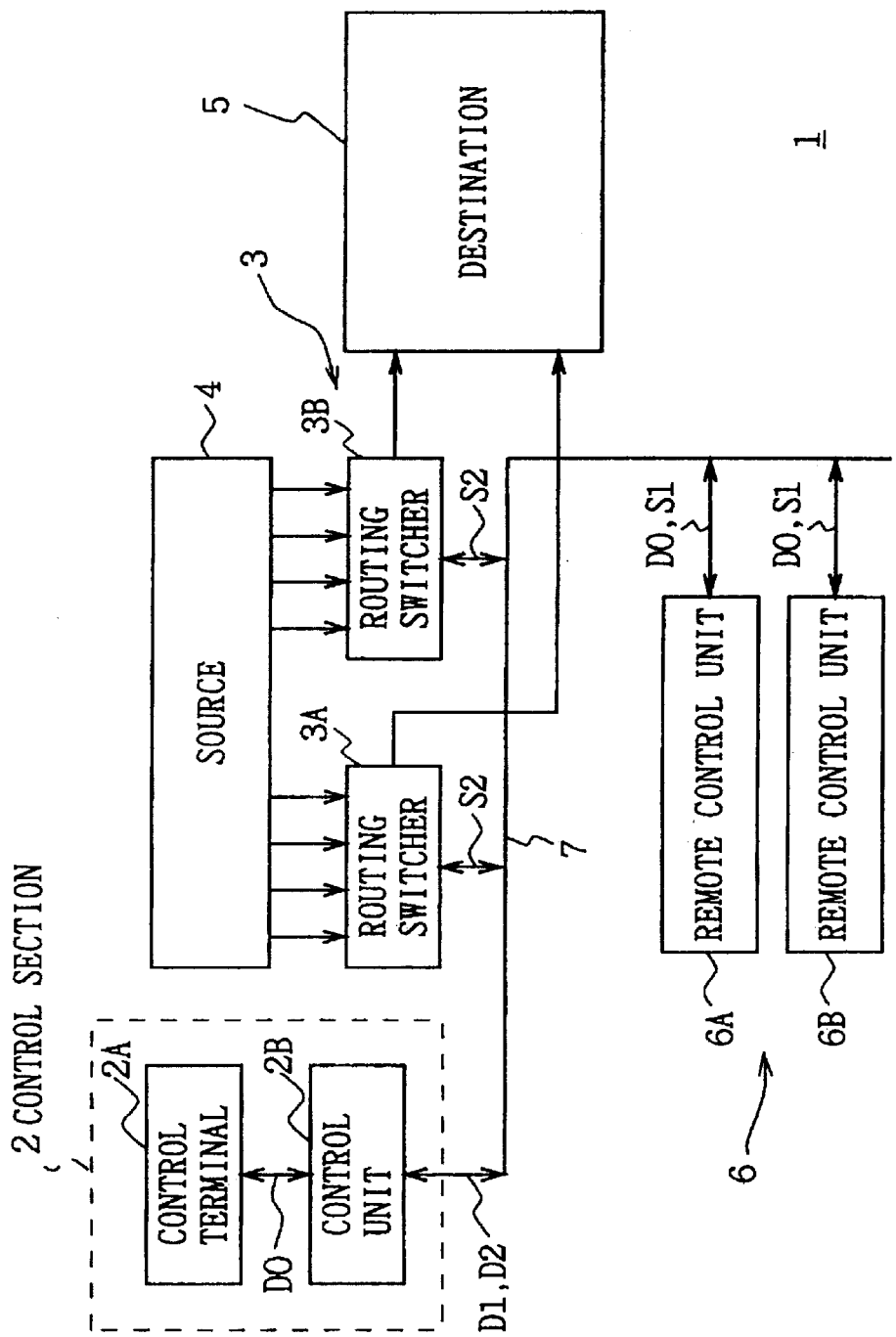
FIG. 1 is a block diagram illustrating the general configuration of a switcher apparatus according to a first embodiment of the present invention.

In FIG. 1, a switcher apparatus according to the present invention, generally designated by 1, switches input lines and output lines of a routing switchers 3 (3A and 3B) under the control of a control-unit 2 to set input/output routes for inputted signals, thereby outputting each input signal originated from each of signal sources such as a VTR, a camera and so on installed in an originating section (source) 4, corresponding to respective input lines, to a desired destination specified from a plurality of destinations such as a VTR, a monitor, and so on installed within a receiving section (destination) 5 connected to respective output lines.

The control unit 2, serving as a control station, displays on a monitor (not shown) a setting screen for performing basic setting associated with the switching of input lines and output lines in the routing switchers 3A and 3B on a control terminal 2A.

In this event, each remote control unit 6 (6A and 6B) individually reads route setting data D0, which has been set for the remote control units 6A and 6B themselves, and sends this to the control terminal 2A in the control unit 2 through a S (Serial) bus 7.

The control terminal 2A displays the contents of the route setting data D0 on the setting screen, and sends new route setting data representative of input/output routes set by the user through key inputs based on the contents from the control unit 2B to the remote control unit 6 and a routing switcher 3 through the S-bus 7 to perform basic setting for the input/output route.

Figure 2:
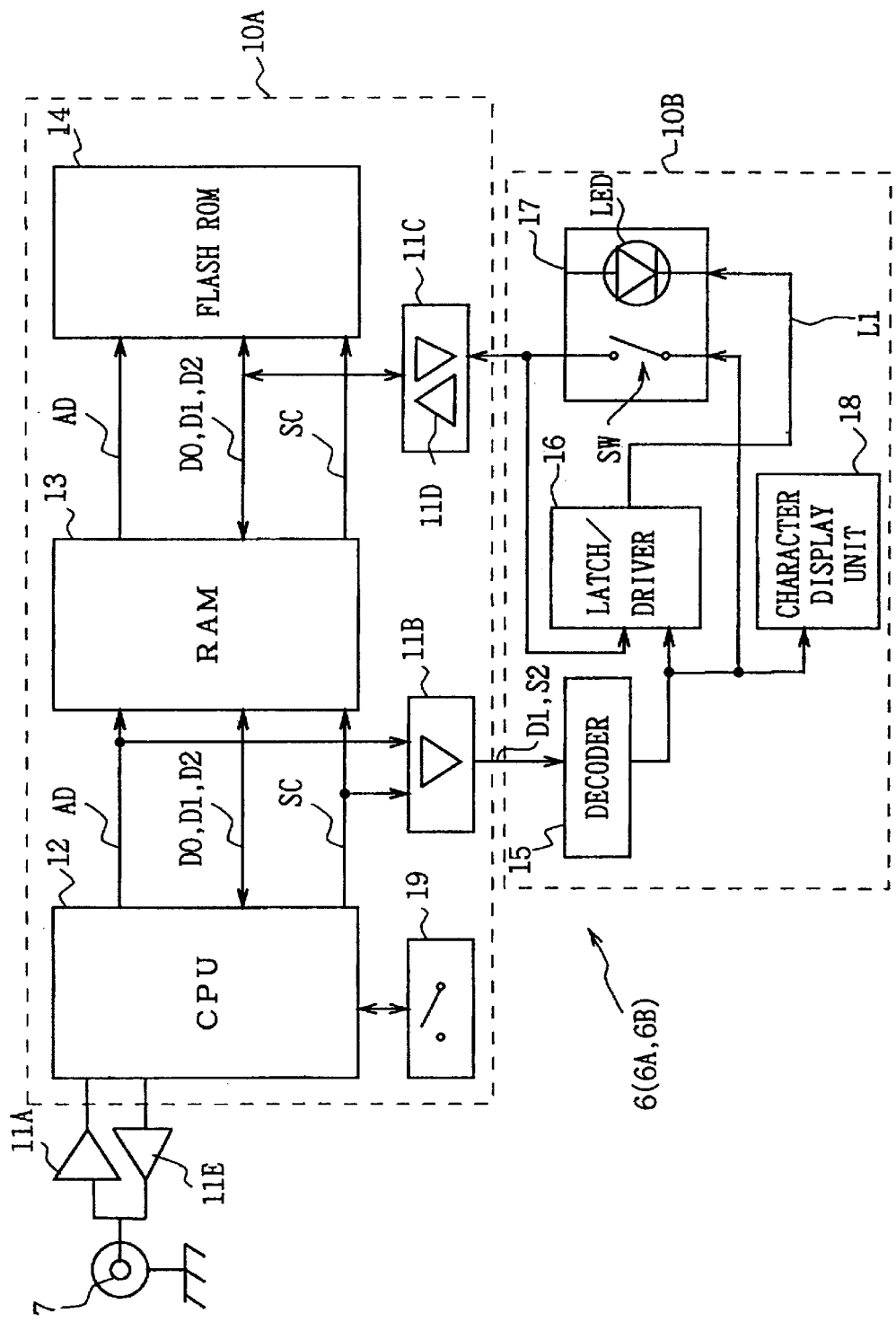
FIG. 2 is a block diagram illustrating the configuration of a remote control unit according to the first embodiment.

More specifically, as illustrated in FIG. 2, the remote control unit 6, in response to a request from the control unit 2 (FIG. 1), reads the route setting data D0 representative of input/output routes set in the current remote control unit 6 itself from a flash ROM (Read Only Memory) 14 under the control of a CPU (Central Processing Unit) 12 in a control unit 10A, and sends it to the control unit 2 through a RAM (Random Access Memory) 13, an input buffer 11E and the S-bus 7. In this event, the control unit 2 displays the data contents of the received route setting data D0 on the setting screen displayed on a monitor of the control terminal 2A.

Then, the control terminal 2A sends new route setting data set by the user through key inputs to the remote control unit 6 and the routing switcher 3, so that the basic setting of input/output lines are performed by the remote control units 6 on the basis of the new route setting data in the routing switcher 3.

Actually, the control unit 2B in the control unit 2 sends the new route setting data to the respective remote control units 6A and 6B for switching input/output routes through the S-bus 7.

The respective remote control units 6A and 6B specify switching of input/output lines based on the new route setting data on the respective control panels, and send switching request data S1 representative of the specified input/output lines to the control unit 2 through the S-bus 7.

Here, in the respective remote control units 6A and 6B, each input/output line of the respective routing switchers 3A and 3B has been previously set corresponding to a selection button 17 disposed on a display unit 10B corresponding to the control panel.

Therefore, when the user selects and depresses a selection button 17 on the control panel (display unit 10B) corresponding to an input line or an output line, for which a switching is desired, the switch SW associated with the selection button 17 is set ON, and a signal representative of the ON state of the switch SW in the selection button 17 at this time is outputted to a RAM 13 in the control unit 10A through a buffer 11D.

In this event, the CPU 12 in the control unit 10A detects the output of the switch SW sent to the RAM 13, and identifies the setting state of the input line or the output line in accordance with the output level. Then, the CPU 12, when recognizing that the predetermined selection button 17 has been selected on the basis of the result of this identification, generates on the RAM 13 switching request data S1 for switching the input line and the output line in response to the selected selection button 17, and outputs this to the control unit 2 through the S-bus 7.

The control unit 2, upon receiving the switching request data S1, generates route setting data D1 for setting input/output routes in the routing switchers 3A and 3B in response to the switching request from each of the remote control units 6A and 6B by the switching request data S1, and sends it to the respective routing switchers 3A and 3B.

In this event, on a control panel (not shown) of the control unit 2B configured substantially similar to the display unit 10B of the respective remote control units 6A and 6B, the control unit 2 lights selection buttons corresponding to an input line and an output line based on the route setting data D1, thereby making it possible to display the route setting states for the input/output lines for which switching has been set in the respective routing switchers 3A and 3B.

The respective remote control units 6A and 6B each have an ID (Identification) switch 19 such that a station ID unique to each of the remote control units 6A and 6B is set by the ID switch 19. This enables the control unit 2 to identify the remote control units 6A and 6B with the station IDs when data is transmitted and received between the control unit 2 and the remote control units 6.

Each of the routing switchers 3A and 3B, upon receiving the route setting data D1 sent thereto from the control unit 2, respectively sets input/output routes based on the route setting data D1.

When the input/output lines have been switched in this way in the routing switchers 3, the control unit 2B in the control unit 2 next queries the respective switchers 3A and 3B about the results of switching the input/output routes.

Responsively, each of the routing switchers 3A and 3B sends input/output line switching result data S2 to the control unit 2B through the S-bus 7 when there is any input/output line for which a cross-point has been switched on the basis of the route setting data D1. In this way, the respective routing switchers 3A and 3B transmit the input/output line switching result to the control unit 2.

In this event, the control unit 2, upon receiving the switching result data S2, generates route switching result data D2 which reflects the input/output line switching results from the respective routing switchers 3A and 3B based on the switching result data S2, and sends this to the respective remote control units 6A and 6B.

Consequently, each of the remote control units 6A and 6B, upon receiving the route switching result data D2 transmitted thereto from the control unit 2, lights selection buttons corresponding to input/output lines that have been switched and set, and displays the names of the input/output lines on a control panel, later described, based on the route switching result data D2.

The remote control unit 6, upon receiving the route switching result data D2 for input/output routes sent thereto from the control unit 2 at the control unit 10A through the S-bus 7 and the input buffer 11A, extends the route switching result data D2 on the RAM 13 through the CPU 12.

Here, the remote control unit 6 extends the route setting data D0 previously stored in the flash ROM 14 and the route switching result data D2 newly sent thereto from the control unit 2 on the RAM 13 under the control of the CPU 12, so as to collate the route setting data D0 with the route switching result data D2.

In this event, the CPU 12 controls the RAM 13 and the flash ROM 14 with a control signal SC, and specifies addresses in the RAM 13 and the flash ROM 14 with address data AD.

Specifically, the remote control unit 6 reads the route setting data D0 and a data processing program from the flash ROM 14 in the control unit 10A under the control of the CPU 12, and compares the route setting data D0 read in accordance with the data processing program with the newly sent route switching result data D2.

The remote control unit 6 further detects the addresses of cross-points in the respective routing switchers 3A and 3B based on the result of the comparison between the route setting data D0 and the route switching result data D2 under the control of the CPU 12 to search for the input/output routes. Then, in the control unit 10A, the route switching result data D2 including the addresses of the cross-points detected by the CPU 12 is sent through the buffer 11B to the display unit 10B.

In this event, selection buttons 17 corresponding to the input/output lines in the routing switchers 3 are lit on the display unit 10B of the remote control unit 6 based on the route switching result data D2 sent thereto from the control unit 2, thereby displaying the input/output routes set for the routing switchers 3 by lighting the selection buttons 17.

Specifically, on the display unit 10B of the remote control unit 6, the input/output line route switching result data D2 inputted from the control unit 10A through the buffer 11B is decoded by a decoder 15, and lighting data L1 is outputted to a selection button 17 corresponding to a switched input line through a latch/driver 16 in accordance with address data for cross-points included in the route switching result data D2. In this way, the display unit 10B controls lighting of a light emitting diode LED disposed in the selection button 17 to turn on and off based on the route switching result data D2.

Also, on the display unit 10B, a switch SW of each selection button 17 is controlled to be on and off based on control data derived by decoding the route switching result data D2 by the decoder 15.

Further, on the display unit 10B, address data derived by decoding the route switching result data D2 by the decoder 15 is outputted to a character display unit 18. The character display unit 18 displays the name of an input line and the name of an output line of an input/output route in accordance with the input address data.

For reference, the character display unit 18 displays the category name (type) of an input source as the name of an input line and an input line number, and the type of an output destination as the name of an output line and an output line number.

In this way, in the switcher apparatus 1, the control unit 2, serving as a control station, collects the switching request data S1 for the routing switchers 3 from the respective remote control units 6A and 6B, generates the route switching data D1 for setting routes of input/output lines, and sending the route switching data D1 to the respective routing switchers 3A and 3B through the S-bus 7 to switch the input/output lines in the routing switchers 3A and 3B.

Further, the control unit 2 collects the input/output line switching result data S2 sent thereto from the respective routing switchers 3A and 3B, generates the route switching result data D2, and transmits the route switching result data D2 to the respective control units 6A and 6B through the S-bus 7.

In this way, the respective remote control units 6A and 6B can display the names of respective input/output lines switched in the respective routing switchers 3A and 3B, as well as selection buttons corresponding to the respective input/output lines on the control panels based on the route switching result data D2.

(1-2) Setting of Extended Level

Figure 3:
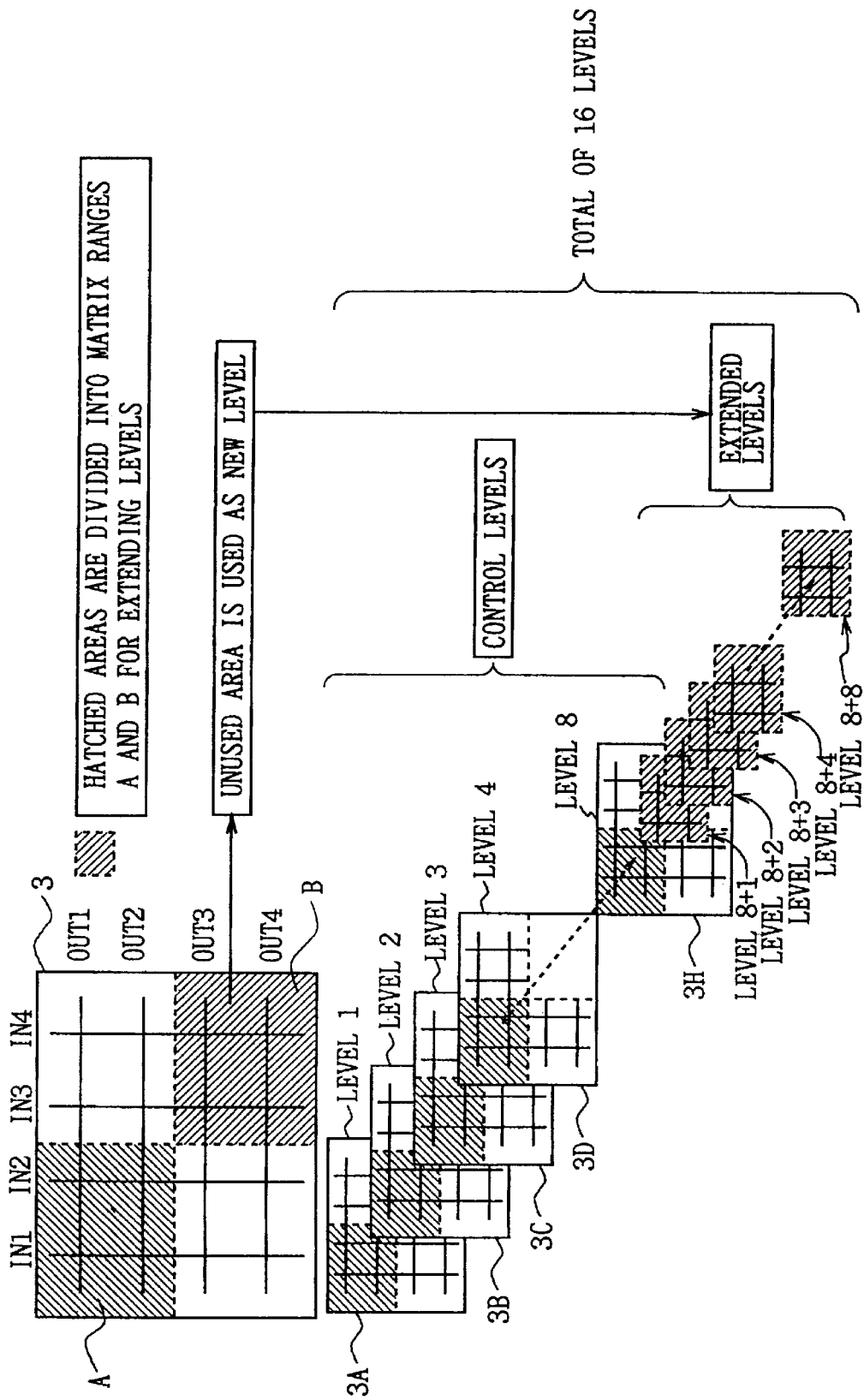
FIG. 3 is a schematic diagram illustrating an extended level setting method.

The switcher apparatus 1 is provided with eight units of routing switchers 3 (3A–3H), for example, as illustrated in FIG. 3, and is set to allow the individual routing switchers 3 to handle a maximum of 16 types of signals using eight remote control units 6 connected thereto, thereby making it possible to control the switching of input/output routes for a maximum of 16 levels of signals.

In the switcher apparatus 1, assuming that a whole switching control range by the control unit 2 is a matrix range organized by 4×4 input/output lines, if a matrix range A of the routing switcher 3, indicated by hatching, is set by input lines IN1, IN2 and output lines OUT1, OUT2, input lines IN3, IN4 and output lines OUT3, OUT4 within a matrix range B indicated by hatching are unused input/output lines.

It should be noted that for convenience of explanation, the whole control range of the control unit 2 is assumed to be organized by 4×4 input/output lines in each routing switcher 3.

In the switcher apparatus 1, if control levels are set to switch input/output routes for eight levels of signals using the common matrix range A with eight routing switchers 3A–3H, unused input lines IN3, IN4 and output lines OUT3, OUT4 exist on each level. Stated another way, in the switcher 1, the area of the unused matrix range B exists in each of the routing switchers 3A–3H.

Now, the switcher apparatus 1 has eight routing switchers 3, i.e., has eight levels of control levels capable of controlling the switching of signal input/output routes. Therefore, if the area of the unused matrix range B existing on each level is newly set as an extended level, eight levels can be further extended, thereby making it possible to use 16 levels as setting levels, i.e., the sum of the control levels and the extended levels, which is twice the original level.

Thus, for setting the area of the unused matrix range B including input lines IN3 onward and output lines OUT3 onward as extended levels 9–16 (eight levels), the switcher apparatus 1 is configured to previously store offset data "NEXT LEVEL SOURCE TOP IN3, NEXT LEVEL DESTINATION TOP OUT3" (hereinafter, this is referred to as the offset data "IN3, OUT3") as unused matrix range information indicative of the area of the matrix range B, and selected matrix range information represented by desired input lines and output lines selected from the area of the matrix range B on and after the offset data "IN3, OUT3" in the flash ROM 14 of each remote control unit 6.

The switcher apparatus 1 therefore reads the offset data "IN3, OUT3" and the selected matrix range information stored in the flash ROM 14 through the CPU 12 of each remote control unit 6, and allocates the extended levels 9–16 one by one to the areas of the unused matrix ranges B of the respective routing switchers 3A–3H on the RAM 13 based on the read information, so that a total of 16 levels can be set as the sum of the control levels 1–8 and the extended levels 9–16.

Actually, in the switcher apparatus 1, the area of the matrix range B of the level 1 is designated as the extended level 9, the area of the matrix range B of the level 2 is designated as the extended level 10, and so on, until the area of the matrix range B of the level 8 is designated as the extended level 16, thus setting the level 9 to the level 16 as extended levels.

Here, the switcher apparatus 1 is capable of simultaneously controlling the switching of input/output routes for many types of signals associated with a single VTR even on the extended levels 9–16, as if the areas of the matrix ranges A were apparently used as extensions of the control levels 1–8.

More specifically, since the area of the matrix range B is located two input/output lines offset from the area of the matrix range A in the switcher apparatus 1, an offset value "2" is used for conversion in order to correspond IN3, IN4 and OUT3, OUT4 of the matrix range B to the input lines IN1, IN2 and the output lines OUT1, OUT2 in the matrix range A.

Actually, the switcher apparatus 1 switches signal input/output routes on all of the 1–16 levels by specifying, for example, a cross-point [IN1, OUT1]. For this purpose, when each remote control unit 6 receives the route setting data D1 from the control unit 2, the remote control unit 6 is only required to switch an input/output route to the specified cross-point [IN1, OUT1] on the control levels 1–8, whereas the remote control unit 6 should switch an input/output route to a cross-point [IN3, OUT3], derived by adding the offset value "2" to [IN1, OUT1] of the specified cross-point, respectively, since the areas of the matrix ranges B are used on the extended levels 9–16.

In this event, for the control levels 1–8, the switcher apparatus 1 is only required to switch the input route to the cross-point [IN1, OUT1], and then to examine the type of signal (input source name) inputted to the input line "IN1" for displaying it on the character display unit 18 disposed on the control panel of the remote control unit 6. However, for the extended levels 9–16, since the input line actually switched in correspondence to the specified input line "IN1" is "IN3," the switcher apparatus 1 examines the type of signal (input source name) on the input line "IN3" for displaying the input source name as a signal inputted to the input line "IN1."

In this way, the switcher apparatus 1, when switching an input/output route for a signal, executes this by supplying the route setting data D1 from the remote control unit 6 to the routing switchers 3 through the S-bus 7, and displaying the type of signal on the consequently switched input/output lines on the character display unit 18. Thus, the user can readily recognize the type of signal on the switched input/output lines in the input/output route by confirming the character display unit 18 of the remote control unit 6.

Figure 4:
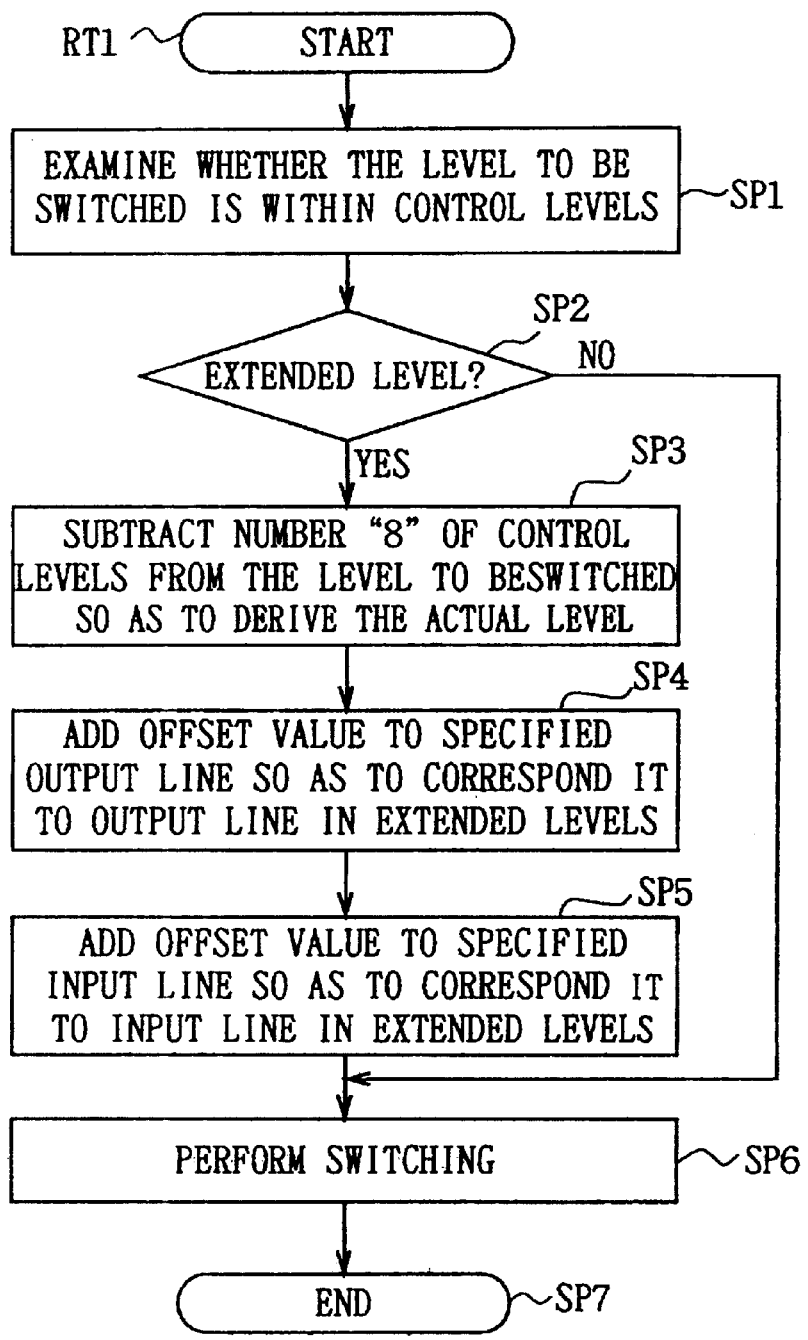
FIG. 4 is a flow chart illustrating a procedure for an input/output route switching processing on an extended level.

In the following, a processing procedure for switching a signal input/output route on a level specified by the user by the CPU 12 of the remote control unit 6 in the switcher apparatus 1 will be explained with reference to a flow chart of FIG. 4.

First, the CPU 12 in the control unit 10A enters from a starting step at RT1, and proceeds to step SP1. At step SP1, the CPU 12 examines whether a level on which a signal input/output route is switched belongs to the control levels within the levels 1–8 or to the extended levels within the levels 9–16, based on a switching request which has been set by the user on the control panel of the remote control unit 6.

At step SP2, the CPU 12 determines whether or not the level specified to switch the signal input/output route is an extended level based on the switching request. If a negative result is returned, this means that the specified level is a control level within the levels 1–8, in which case, a conversion using the offset value is not required, so that the CPU 12 proceeds to step SP6 to switch the input/output rout to a specified cross-point on the specified level, followed by the termination of the processing (step SP7). Conversely, if an affirmative result is returned at step SP2, this means that the level specified for switching is an extended level within the levels 9–16, in which case, the CPU 12 proceeds to step SP3.

At step SP3, the CPu 12 subtracts the number "8" of the control levels 1–8 from the number of the specified level (for example, a number "12" when the level 12 is specified) to derive an actual control level "4," and proceeds to step SP4. In this event, the CPU 12 recognizes that the specified level 12 is actually an extended level that uses the matrix range B of the level 4.

At step SP4, the CPU 12 adds the offset value "2" to the number of an output line connected to the cross-point specified by the user on the normal control levels 1–8 (the matrix range A) to correspond it to an output line in the matrix range B of the level 4, and proceeds to step SP5.

For example, when a cross-point [IN1, OUT1] is specified for switching an input/output route for a signal in the area of the matrix range A, the CPU 12 adds the offset value "2" to the line number "1" of a specified output line "OUT1" to derive an output line "OUT3" which is corresponded to the output line "OUT1" in the matrix range A, because the cross-point [IN1, OUT1] does not exist in the area of the matrix range B.

At step SP5, the CPU 12 adds the offset value "2" to the number of an input line connected to the cross-point specified by the user on the normal control levels 1–8 (the matrix range A) to correspond it to an input line in the matrix range B of the level 4, and proceeds to step SP6. Again, in this event, if the cross-point [IN1, OUT] has been specified for switching a signal input/output route in the area of the matrix range A, the cross-point [IN1, OUT1] does not exist in the area of the matrix range B, so that the CPU 12 adds the offset value "2" to the line number "1" of a specified input line "IN1" to derive an input line "IN3" which is corresponded to the output line "IN1" in the matrix range A.

At step SP6, the CPU 12 switches the signal input/output route to the cross-point of the input line "IN3" and the output line "OUT3," to which the offset value "2" has been added at the aforementioned steps SP4 and SP5, and proceeds to step SP7 to terminate the processing.

As described above, when a signal input/output route is switched on the extended levels 9–16, the switcher apparatus 1 can add an offset value to respective input/output lines at a cross-point specified in the area of the matrix range A so that they can be corresponded to input/output lines in the area of the matrix range B, consequently making it possible to switch a signal input/output route in the area of the matrix range B based on a cross-point specified in the area of the matrix range A. In other words, the CPU 12 can switch a signal input/output route even on the extended levels 9–16 based on a cross-point specified on the control levels 1–8.

Figure 5:
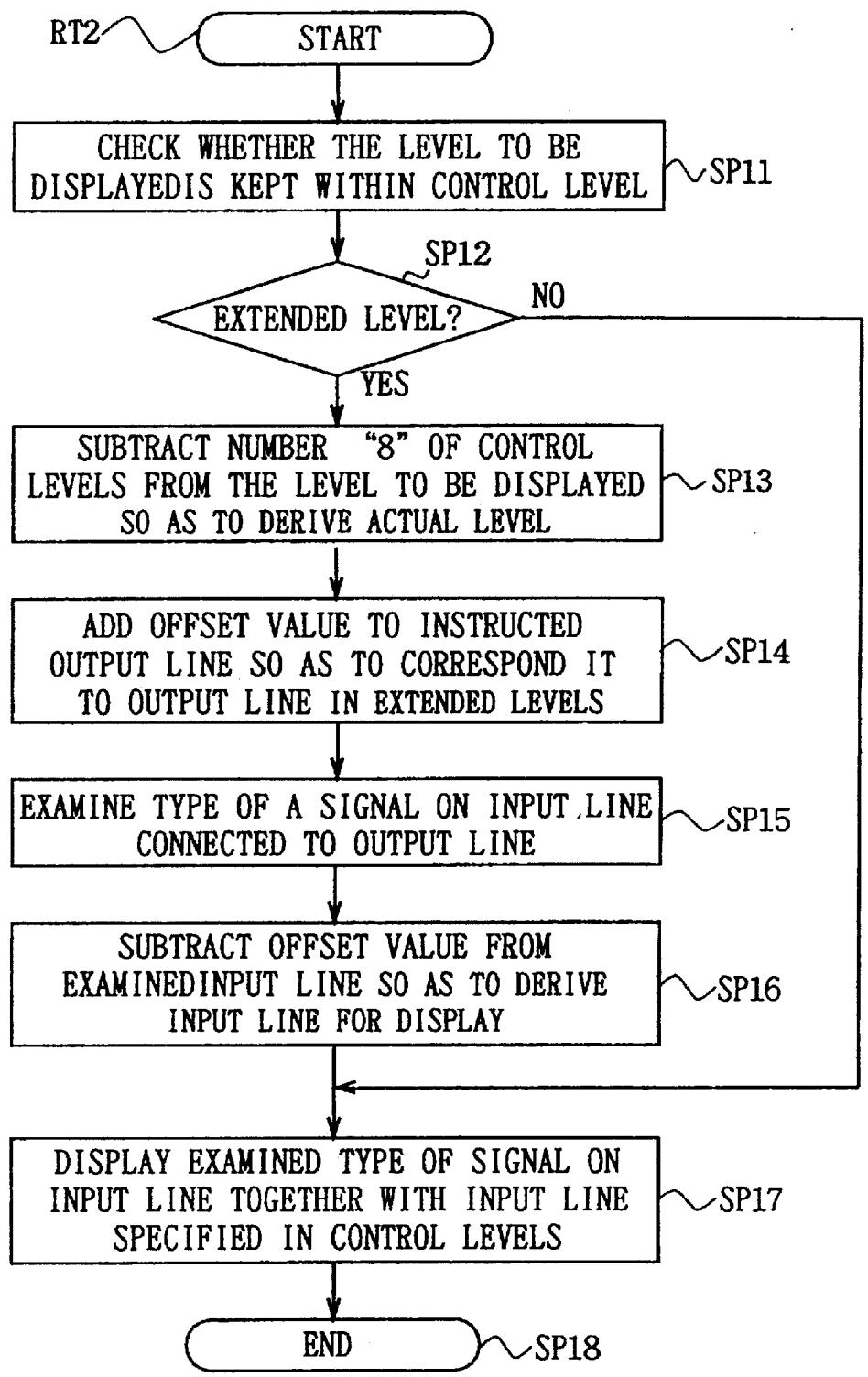
FIG. 5 is a flow chart illustrating a procedure for display processing on the extended level.

Next, a processing procedure for examining the type of a signal on switched input/output lines by the CPU 12 of the remote control unit 6 in the switcher apparatus 1, when an input/output route has been switched for a signal on a level specified by the user, and for displaying the type of the signal on the character display unit 18, will be explained with reference to a flow chart of FIG. 5.

First, the CPU 12 in the control unit 10A enters from a starting step at RT2 and proceeds to step SP11. At step SP11, the CPU 12 examines whether or not a level of a signal to be displayed on the character display unit 18 belongs to the control levels within the levels 1–8.

At step SP12, the CPU 12 determines whether or not a level to be displayed is an extended level. If a negative result is returned here, this means that the level to be displayed is not an extended level but a control level, in which case, a conversion using the offset value is not required, so that the CPU 12 proceeds to step SP17 to examine and display the type of signal on input/output lines of a switched input/output route on the specified level, followed by the termination of the processing (step SP18).

Conversely, if an affirmative result is returned at step SP12, this means that the level to be displayed is an extended level within the extended levels 9–16, in which case the CPU 12 proceeds to step SP13.

At step SP13, the CPU 12 subtracts the number "8" of the control levels 1–8 from the number of the level to be displayed (for example, the number "12" if the level 12 is displayed) to derive an actual control level "4," and proceeds to step SP14. In this event, the CPU 12 recognizes that the level 12 to be displayed is actually an extended level that uses the area of the matrix range B on the level 4.

At step SP14, the CPU 12 adds the offset value "2" to the number of an output line corresponding to the cross-point specified by the user on the normal control levels 1–8 (the matrix range A) to correspond it to an output line in the matrix range B of the level 4, and proceeds to step SP15. For example, when a cross-point [IN2, OUT2] is specified for switching a signal input/output route in the area of the matrix range A, the CPU 12 adds the offset value "2" to the line number "2" of a specified output line "OUT2" to derive an output line "OUT4" which is corresponded to the output line "OUT2" in the matrix range A, because the cross-point [IN2, OUT2] does not exist in the area of the matrix range B.

At step SP15, the CPU 12 switches the signal input/output route in the matrix range B on the level 4 based on the route setting data D1, examines the type of a signal on an input line (IN4 in this case) connected to the switched output line "OUT4," and proceeds to step SP16.

At step SP16, the CPU 12 subtracts the offset value "2" from the line number "4" of the examined input line "IN4" to derive the input line "IN2," and proceeds to step SP17.

At step SP17, the CPU 12 displays the type of the signal on the input line "IN4" examined at step SP15, together with the input line "IN2" on the character display unit 18, as if it were a signal on the input line "IN2" in the area of the matrix range A belonging to the control levels, and proceeds to step SP18 to terminate the processing.

As described above, for examining and displaying the type of a signal on switched input/output lines of an input/output route on the extended levels 9–16, the switcher apparatus 1 adds an offset value to the numbers of the input/output lines at the specified cross-point, switches the input/output route corresponding to actual input/output lines on the extended levels, and then examines the type of the signal on the input/output lines to display the type of the signal together with the numbers of the input/output lines on the character display unit 18.

In this way, even if a input/output route is switched for a signal using the area of the matrix range B on the extended levels 9–16, the switcher apparatus 1 can display the type of the signal as if the input/output route were switched using input/output lines in the matrix range A on the control levels 1–8.

(1-3) Operation and Effect in First Embodiment

In the foregoing configuration, for using the area of the matrix range B, which is not used on the normal control levels 1–8 (FIG. 3), as extended levels 9–16 in the switcher apparatus 1, offset data "IN3, OUT3" and selected matrix range information represented by desired input lines and output lines selected from the area of the matrix range B on and after the offset data "IN3, OUT3" have been previously stored in the flash ROM 14. The offset data "IN3, OUT3" and the selected matrix range information are read by the CPU 12 and extended on the RAM 13 to set extended levels 9–16 based on the offset data "IN3, OUT3" and the selected matrix range information.

In this way, even if types of signals are increased, the switcher apparatus 1 can set levels in accordance with an increase in the type of signals only with the existing routing switchers 3A–3H by setting the extended levels 9–16 for switching input/output routes for new signals using the unused matrix range B, without newly installing additional routing switchers 3, and consequently can control the switching of input/output routes for respective signals.

Also, since the switcher apparatus 1 makes a conversion using an offset value for switching an input/output route on the extended levels 9–16 based on an input/output route switching request specified on the control levels 1–8, a signal input/output route can be switched even on the extended levels 9–16 based on a switching request specified on the control levels 1–8.

Thus, the switcher apparatus 1 can switch a signal input/output route in the area of the matrix range B on the extended levels 9–16 only by specifying a desired cross-point in the area of the matrix range A on the control levels 1–8, even when input/output routes are to be simultaneously switched for 16 types of signals associated with a single VTR, thereby facilitating operations performed by the user.

Also, since the switcher apparatus 1 makes a conversion using an offset value when an input/output route is switched for a signal on the extended levels 9–16, the switcher apparatus 1 can examine the type of the signal on the switched input/output lines and apparently display the signal as if it were a signal on input/output lines on the control levels 1–8.

Consequently, the switcher apparatus 1 displays the type of a signal on switched input/output lines on the character display unit 18 as if it were a signal on input/output lines on the control levels 1–8, after the switcher apparatus 1 has switched the input/output route for the signal on the extended levels 9–16. Since the user can confirm the signal on the extended levels 9–16 in a display form similar to the control levels 1–8, the confirmation is significantly facilitated.

According to the configuration described above, the switcher apparatus 1 sets the area of the unused matrix range B on the normal control levels 1–8 as the extended levels 9–16, so that even if types of signals to be handled are increased, the switcher apparatus 1 can assign additional signals to the extended levels 9–16 to switch signal input/output routes for each level, thereby making it possible to effectively utilize the matrix range, and eliminate the need for installing additional routing switchers 3 to prevent an increased size of the whole apparatus.

Figure 6:
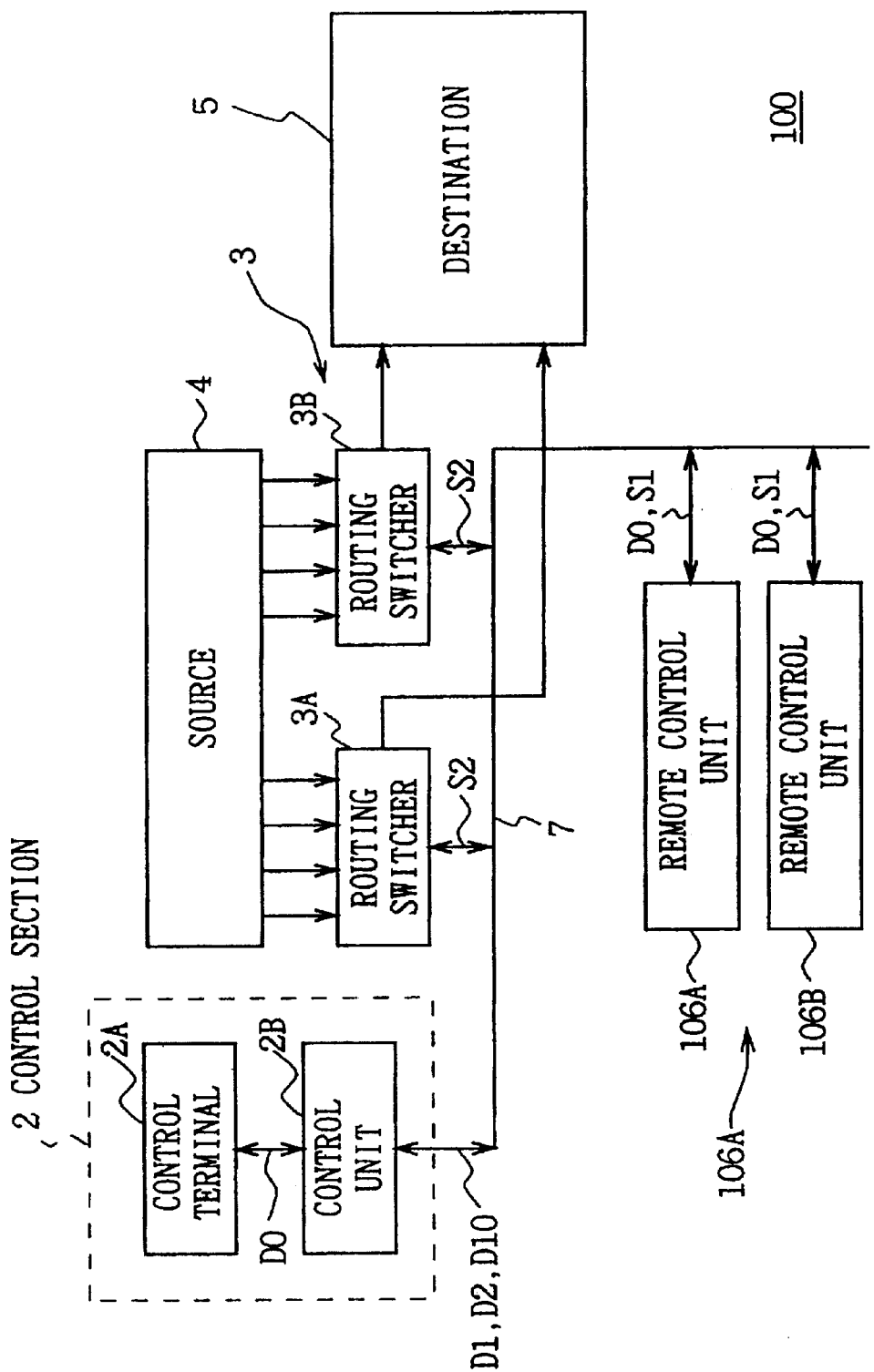
FIG. 6 is a block diagram illustrating the general configuration of a switcher apparatus according to a second embodiment of the present invention.
Figure 7:
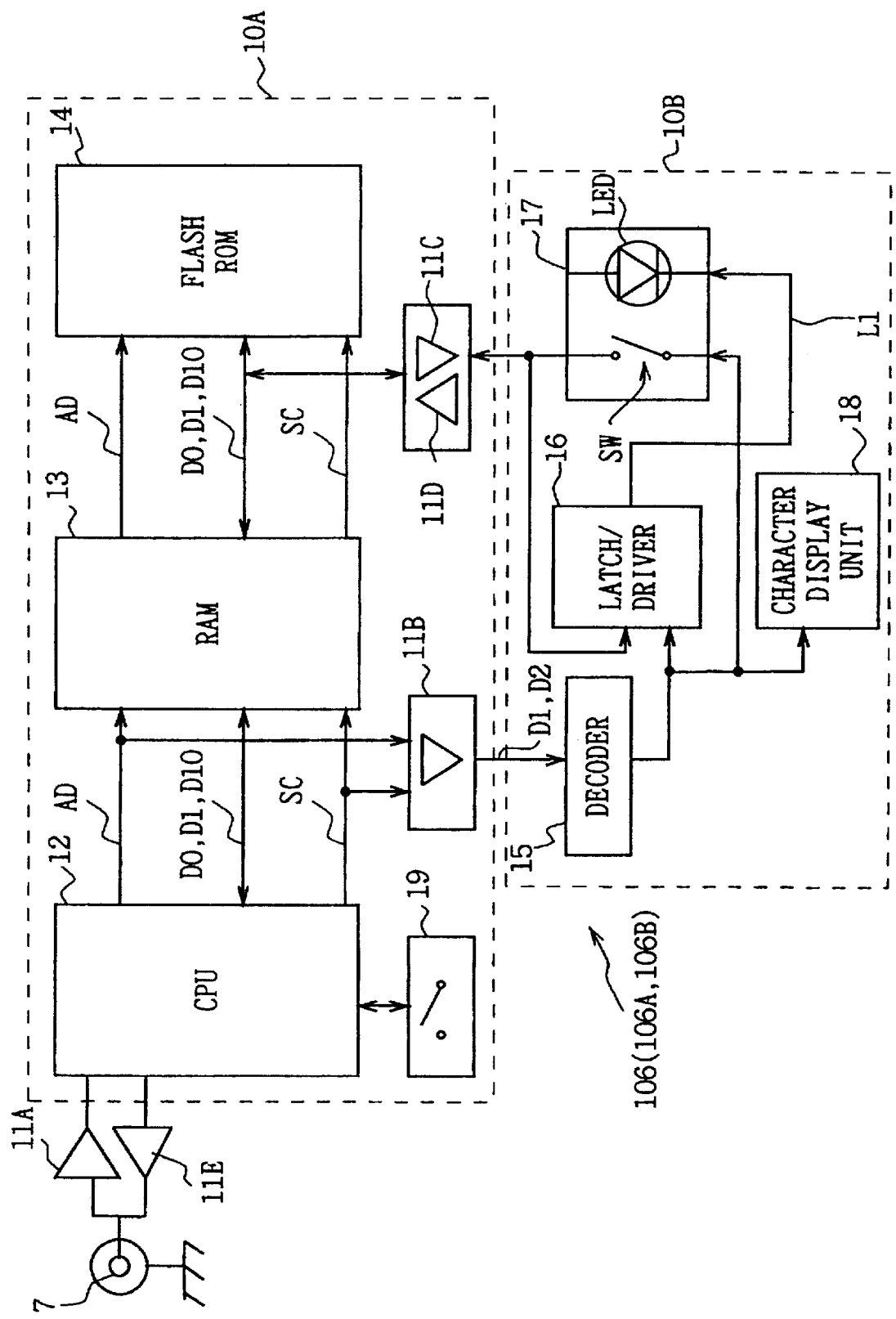
FIG. 7 is a block diagram illustrating the configuration of a remote control unit according to the second embodiment.

(2) Second Embodiment
(2-1) General Configuration of Switcher Apparatus in Second Embodiment As illustrated in FIG. 6, a switcher apparatus 100 in a second embodiment has the configuration identical to the switcher apparatus 1 in the first embodiment except that remote control units 106 (106A and 106B) are newly installed instead of the remote control units 6 (FIG. 1). Also, the remote control units 6 differ from the remote control units 106 illustrated in FIG. 7 only in the processing contents, with the circuit configurations being identical. Therefore, description on FIGS. 6 and 7 is omitted.

(2-2) Switching of Input/Output Lines in Routing Switcher

Figures 8, 9:
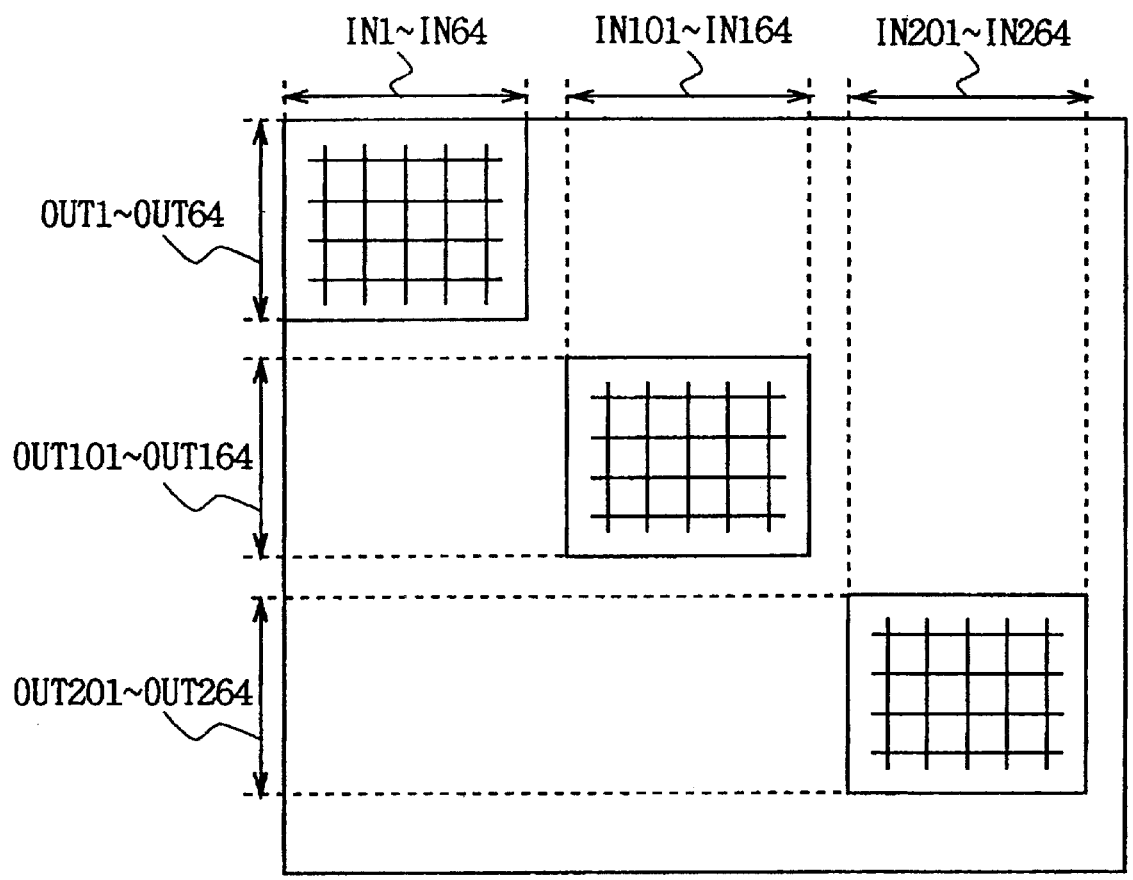
FIG. 8 is a schematic diagram illustrating the configuration of a routing switcher according to the second embodiment.
FIG. 9 is a schematic diagram used for explaining how to set input line and output line ranges.

As illustrated in FIG. 8, the routing switcher 3 actually uses, for example, input lines IN1–IN 64, IN101–IN164 and IN201–IN264 within 512 input lines provided on the input (IN) side, as well as OUT1–OUT64, OUT101–OUT164, OUT201–OUT264 corresponding to the respective input lines IN1–IN64, IN101–IN164 and IN201–IN264, respectively, as output lines.

Here, in the control unit 2 (FIG. 6), a setting screen on the control terminal 2A is used to input range setting data D10 representative of a matrix using range for input/output lines, as shown in FIG. 9, from the control unit 2B through key manipulations, and the input range setting data D10 is sent to the remote control units 106A and 106B through the S-bus 7. The remote control units 106A and 106B store the received range setting data D10 in the flash ROM 14.

Here, the range setting data D10 is data that indicates a range of output lines to be displayed on the character display unit of the control panel, later described, and a range of input lines which are switchable to the output lines. By setting the respective ranges with line start numbers (TOP) and line end numbers (END) of the output lines and input lines, a range of available input lines is corresponded to a range of desired output lines.

More specifically, output lines OUT1 (TOP)–OUT64 (END) set as a range of output lines are corresponded to input lines IN1 (TOP)–IN64 (END) as an available range; output lines OUT101 (TOP)–OUT164 (END) are corresponded to input lines IN101 (TOP)–IN164 (END) as an available range; and output lines OUT201 (TOP)–OUT264 (END) are corresponded to input lines IN201 (TOP)–IN264 (END) as an available range, respectively.

In the remote control unit 106, therefore, the range setting data D10 sent thereto from the control terminal 2A is once stored in the flash ROM 14, and then read on the RAM 13 for extension to allow for a determination on a range of input lines available to a desired output line selected by the CPU 12 based on the range setting data D10.

Figures 10, 16, 17:
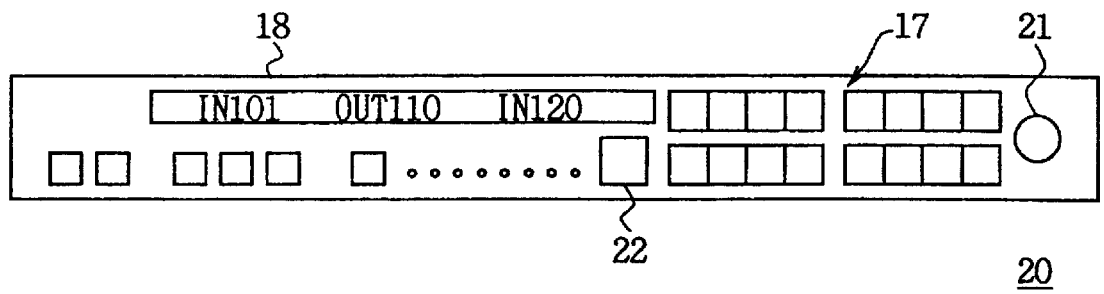
FIG. 10 is a schematic diagram illustrating a control panel.
FIG. 16 is a schematic diagram used for explaining how an input/output route is set.
FIG. 17 is a schematic diagram used for explaining how an input/output route is set.

Actually, when available input lines are set for a desired output line selected from a plurality of output lines in the routing switcher 3 in the remote control unit 106, the user first selects and depresses a selection button 17 corresponding to the desired output line or rotates a selector knob 21 of a rotary encoder on the control panel 20 as illustrated in FIG. 10 to display the name of the desired output line (OUT110 in this case) on the character display unit 18 which may comprise a liquid crystal display.

In this event, in the remote control unit 106, the name (OUT110) of the currently selected output line is displayed on the character display unit 18, and a range of input lines available for switching to the output line is displayed by their names (IN101–IN120 in this case) adjacent thereto on both sides.

Specifically, the CPU 12 in the remote control unit 106 reads the range setting data D10 stored in the flash ROM 14 on the RAM 13, when a desired output line is selected by the user from a plurality of output lines on the character display unit 18 of the control panel 20, and examines a use range of the selected output line based on the data D10.

Then, the CPU 12 determines a use range of input lines corresponding to the output line selected on the basis of the range setting data D10, and displays the range of input lines (IN101–IN120) available for switching to the selected output line, adjacent to the name of the output line (OUT110) on both sides.

In this event, the CPU 12 does not change the display in the character display unit 18 when an input line to be switched in response to a manipulation made by the user on the selection button 17 or the selector knob 21 does not exist within an available range from the determination result based on the range setting data D10. Also, the CPU 12 displays the name of an input line selected, for example, through the selector knob 21 on the character display unit 18 when the input line to be switched does exist within the available range.

The user selects or specifies a desired input line from the thus displayed input lines, and subsequently depresses a take button 22 to set the desired input line corresponded to the desired output line. In this way, the user can freely switch and set any input line displayed on the character display unit 18 within its range available to the desired output line of the routing switcher 3.

As described above, in the remote control unit 106, a range of input lines which can be selected and specified for a desired output line displayed on the character display unit 18 is limited on the basis of the range setting data D10, so that only the names of available input lines are displayed for the desired output line displayed on the character display unit 18. Consequently, it is possible to rapidly complete the setting of input/output lines by limiting data displayed on the character display unit 18 to a minimally required amount, and to prevent erroneous operations by eliminating names of unavailable input lines from the display.

Also, the remote control unit 106 corresponds a matrix arrangement of available input lines and output lines, set with the range setting data D10, to a matrix arrangement of input lines and output lines of the actual routing switcher 3, thereby making it possible to readily and rapidly set the switching of input/output lines.

Further, the remote control unit 106 enables an input/output line switching range to be arbitrarily set on the control panel 20 of each of the remote control units 106A and 106B based on the range setting data D10 having a use range set for input/output lines, thereby making it possible to increase the degree of freedom for input/output line selecting ranges, in addition to a restriction on input lines available to a desired output line.

Further, since the remote control unit 106 corresponds settable output lines and input lines available to the output lines to a range of output lines and a range of input lines, respectively, a display range can be limited and the data amount of the range setting data D10 and the amount of set data can be significantly reduced as compared with the case where available input lines are set individually for each of the output lines.

(2-3) Operation and Effect in Second Embodiment

In the foregoing configuration, when a desired output line is selected or specified from a plurality of output lines by the user through the selection button 17 or the selector knob 21 on the control panel 20 of the remote control unit 106, the CPU 12 in the switcher apparatus 100 examines a use range of the selected or specified output line based on the range setting data D10 read from the flash ROM 14 to the RAM 13.

The CPU 12 further determines an available range of input lines corresponding to the output line selected or specified on the basis of the range setting data D10, and displays only the names of input lines within the available range, adjacent to the output line on both sides on the character display unit 18. Specifically, when an output line OUT1, for example, is selected or specified by the user, the CPU 12 examines based on the range setting data D10 that the range of the output line OUT1 extends over output lines OUT1 (TOP)–OUT64 (END) (FIG. 9).

Then, the CPU 12 does not change a display on the character display unit 18 when an input line to be set for switching to the output line OUT1 does not exist within an available range of the input lines IN1 (TOP)–IN64 (END) (FIG. 9). Conversely, if the input line to be set for switching to the output line OUT1 does exist within the available range of the input lines IN1 (TOP)–IN64 (END), the CPU 12 displays the name of the input line, which has been switched by the selection button 17 or the selector knob 21 on the character display unit 18.

In this way, the CPU 12 can display only input lines available to the selected or specified output line on the character display unit 18 by examining, with the range setting data D10, a range of input lines available to the selected or specified output line.

Consequently, the remote control unit 106 allows for rapid setting of input/output lines by displaying only a minimally required data on the character display unit 18, and can prevent erroneous operations by eliminating names of unavailable input lines from the display.

According to the configuration described above, the switcher apparatus 100 sets an available range of a plurality of output lines arranged in the routing switcher 3, and a range of available input lines limited to the range of the available output lines, as the range setting data D10, through the control terminal 2A of the control unit 2.

In this way, for setting input/output lines to be switched for the routing switcher 3 in the remote control unit 106, the switcher apparatus 100 displays only available output lines on the character display unit 18 under the control of the CPU 12 based on the range setting data D10, and can display only available input lines corresponding to the output lines.

Further, the switcher apparatus 100 limits a display range by corresponding settable output lines and input lines available to the output lines to an output line range and an input line range, respectively, so that the data amount of the range setting data D10 and the amount of set data can be significantly reduced as compared with the case where available input lines are set for each output line.

Thus, the switcher apparatus 100 only displays available input/output lines, thereby making it possible to rapidly switch input/output lines to set an input/output route in the routing switcher 3, and to obviate erroneous setting of an input line for a selected output line.

Figure 11:
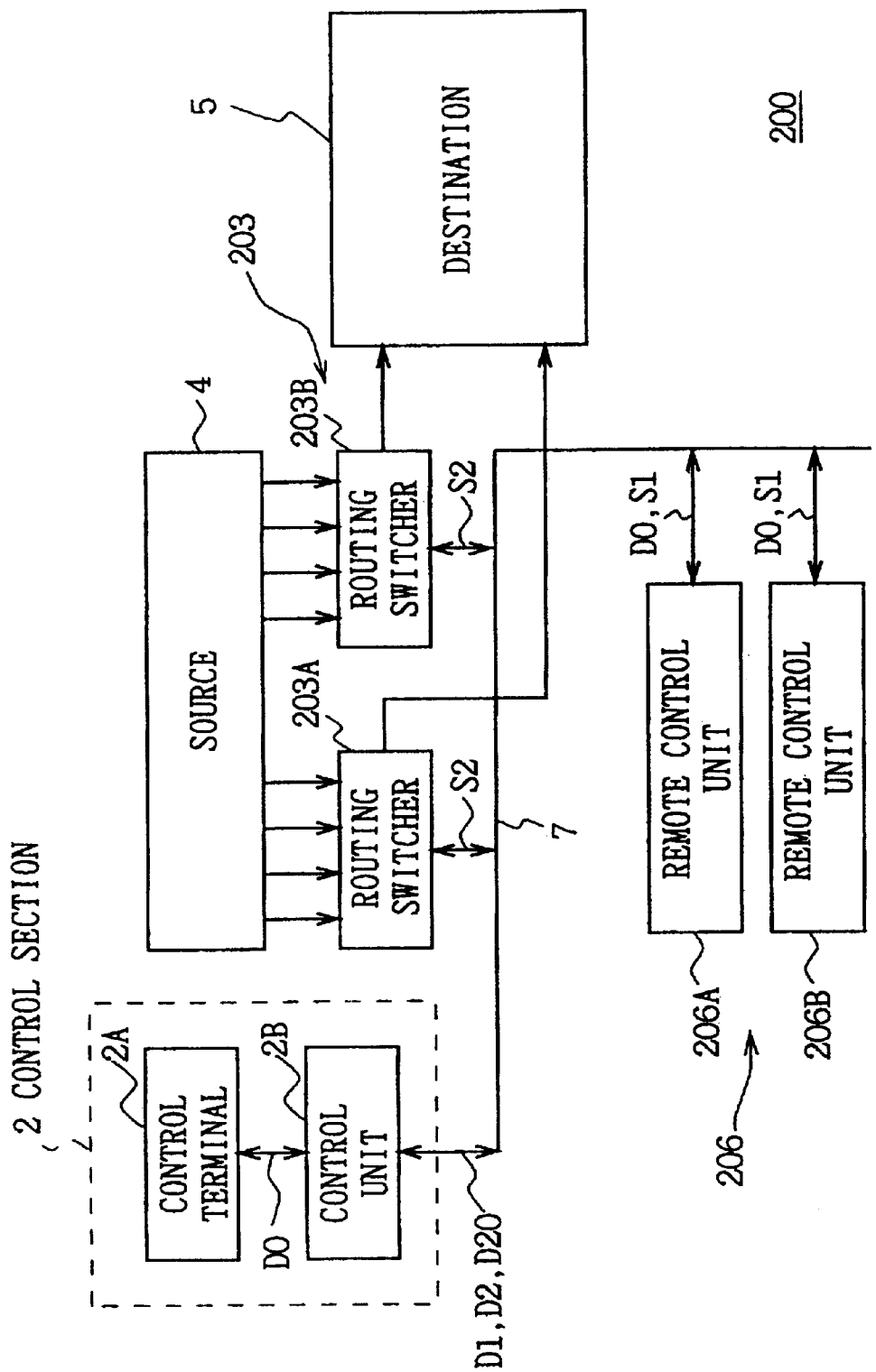
FIG. 11 is a block diagram illustrating the general configuration of a switcher apparatus according to a third embodiment of the present invention.
Figure 12:
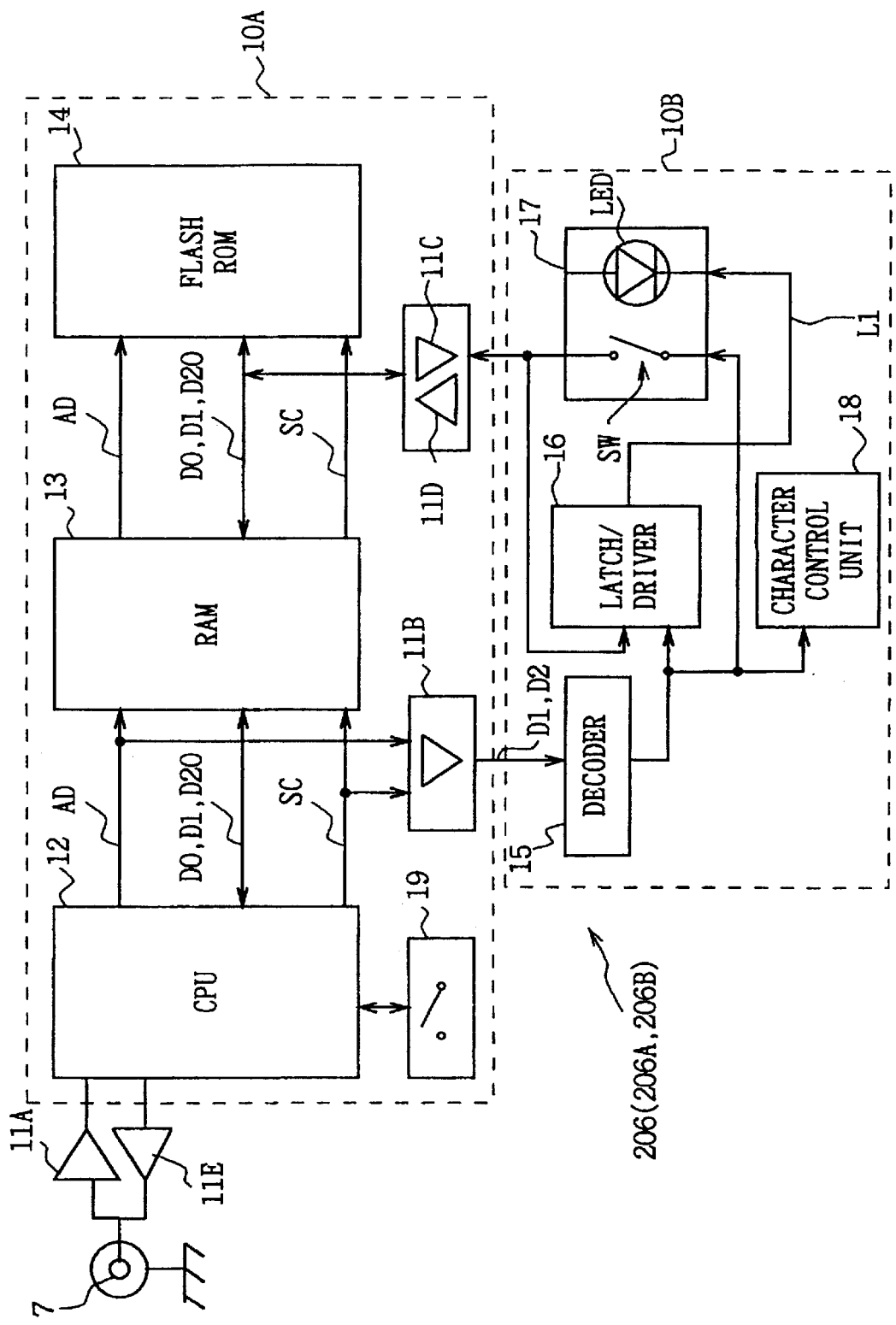
FIG. 12 is a block diagram illustrating the configuration of a remote control unit according to the third embodiment.

(3) Third Embodiment (3-1) General Configuration of Switcher Apparatus in Third Embodiment As illustrated in FIG. 11, a switcher apparatus 200 in a third embodiment has the configuration identical to the switcher apparatus 1 in the first embodiment except that remote control units 206 (206A and 206B) are newly installed instead of the remote control unit 6 (FIG. 1) and routing switchers 203 (203A and 203B) having different matrix arrangements are newly installed instead of the routing switcher 3 (FIG. 1). Also, the remote control units 6 differ from the remote control units 206 illustrated in FIG. 12 only in the processing contents, with the circuit configuration being identical. Therefore, description on FIGS. 11 and 12 is omitted.

(3-2) Extended Inputs of Routing Switcher

Figure 13:
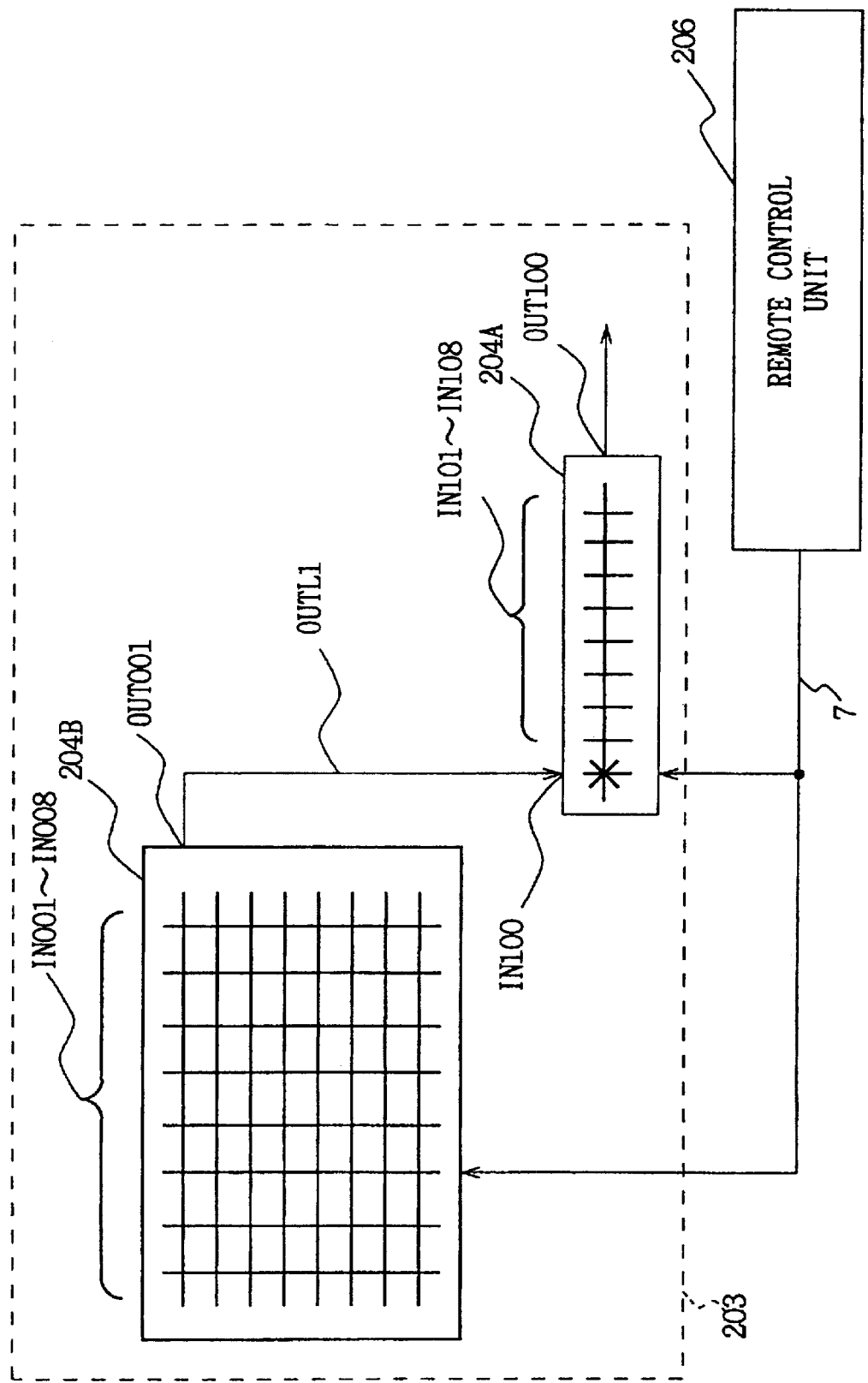
FIG. 13 is a schematic diagram illustrating the configuration of a routing switcher according to the third embodiment.

Next, a specific extending method for extending input lines in the routing switcher 203 will be explained with reference to FIG. 13. As illustrated in FIG. 13, the routing switcher 203 is composed of a matrix-shaped main routing switcher 204A and a matrix-shaped extended routing switcher 204B.

The main routing switcher 204A has input lines IN101–IN108 and an extended input line IN100, such that input signals inputted from these input lines IN101–IN108 and extended input line IN100 are outputted from an output line OUT100 to predetermined targets within the destination 5 (FIG. 11).

The main routing switcher 204 also has the extended input line IN100 connected to an output line OUT001 of the extended routing switcher 204B through an output signal line OUTL1. The extended routing switcher 204B has input lines IN001–IN008 on one side of the matrix, such that input signals from the input lines IN001–IN008 are sent from the output line OUT001 to the extended input line IN100 of the main routing switcher 204A through the output signal line OUTL1.

The main routing switcher 204A and the extended routing switcher 204B can set a signal input/output route in an arbitrary combination by switching to an input line and an output line arbitrarily specified by the remote control unit 206.

Figure 14:
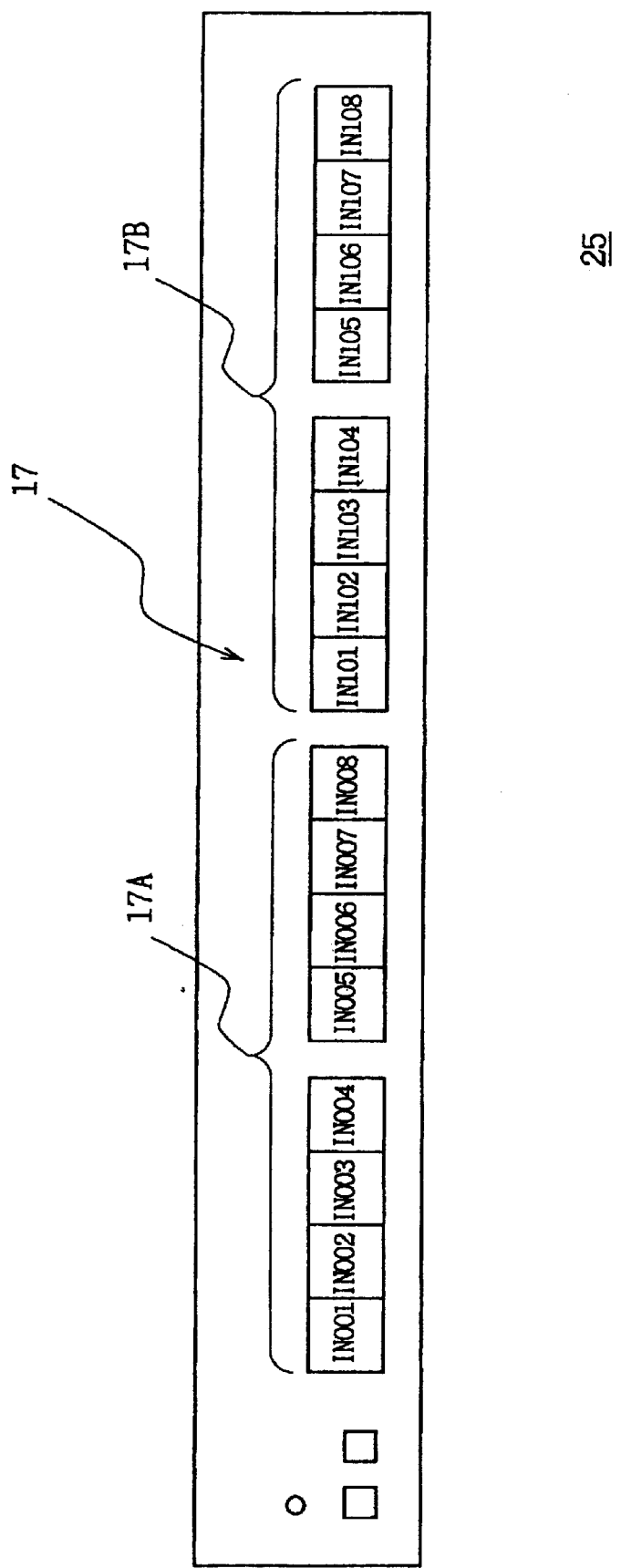
FIG. 14 is a schematic diagram illustrating a control panel.

Subsequently, as illustrated in FIG. 14, the remote control unit 206 has a control panel 25 which is provided with selection buttons 17A respectively corresponding to the input lines IN001–IN008 in the extended routing switcher 204B and selection buttons 17B respectively corresponding to the input lines IN101–IN108 in the main routing switcher 204A, such that a desired input line can be set for the output line OUT100 (FIG. 13) by the user selectively depressing a selection button 17 (17A and 17B) on the control panel 25.

In this case, on the control terminal 2A (FIG. 11) of the control unit 2, a variety of data for setting input/output routes as illustrated in FIGS. 15–17 are displayed on a setting screen of a monitor (not shown), and route setting data D20 is generated on the screen through key inputs for setting input/output routes by the main routing switcher 204A and the extended routing switcher 204B.

Specifically, the control terminal 2A sets the input lines IN101–IN108 in the main routing switcher 204A and the input lines IN001–IN008 in the extended routing switcher 204B as input lines for the output line OUT100 in the main routing switcher 204A, based on the route setting data D20.

In this control terminal 2A, screen data is first read for setting an input/output route as shown in FIG. 15A, and output destinations for input signals inputted to the input lines IN101–IN108 and IN001–IN008 are specified for the output line OUT100. A portion below "SET PANEL TABLE (SOURCE) CONTROL DESTINATION=OUT100" displayed in FIG. 15A indicates that output destinations for input lines specified in this setting screen data are all set to the output line OUT100.

In this event, on the setting screen of the control terminal 2A, the input lines IN001–IN008, IN101–IN108 are allocated to the respective selection buttons 17 by specifying the type of each signal "IN" and a line number (001–008, 101–108) unique to each input line to each "KEY" data having a data number 01–16 corresponding to each of 16 selection buttons 17 (FIG. 14) disposed on the control panel 25, as "KEY=INPUT LINE NUMBER."

As a result, the input lines IN001–IN008, IN101–IN108 are set for the output line OUT100 in the main routing switcher 204A.

Further, as illustrated in FIG. 16, as the user specifies each input line IN001–IN008 in the extended routing switcher 204B displayed on the setting screen of the monitor on the control terminal 2A (FIG. 11), setting is made to switch each input line IN001–IN008 to the output line OUT001 in the extended routing switcher 204B (in the figure, displayed such as "IN LINE NUMBER: OUT001<IN LINE NUMBER").

Further, as illustrated in FIG. 17, as the user inputs through key manipulations route setting data D20 for setting an extended route such as "OUT001: OUT100<IN100" on the setting screen of the monitor on the control terminal 2A, the extended input line IN100 is specified as a route for the output line OUT100 in the main routing switcher 204A, and the input lines IN001–IN008 in the extended routing switcher 204B can be selected as extended inputs from the output line OUT100.

Therefore, when a route setting has been switched on the basis of route setting data D0 which has been set on the control terminal 2A, the control unit 2 simultaneously makes a request for switching to the output line OUT100 and the input line IN100 if switching request data S1 includes the output line OUT001.

Also, when displaying an input/output line selecting state in an input/output route which has been switched and set, the remote control unit 206 examines which of the input lines IN001–IN008 has been selected for the output line OUT001 based on the route setting data 20 of FIG. 17 and displays the input line, when the extended input line IN100 has been selected for the output line OUT100.

Thus, when an input/output route is switched and set for the routing switcher 203 by the user selecting a selection button 17 on the control panel 25, the remote control unit 206 can switch an input/output route in such a state that the input lines IN001–IN008 in the extended routing switcher 204B connected to the extended input line IN100 and the input lines IN101–IN108 in the main routing switcher 204A are just connected respectively to the single output line OUT100 in parallel.

Figure 18:
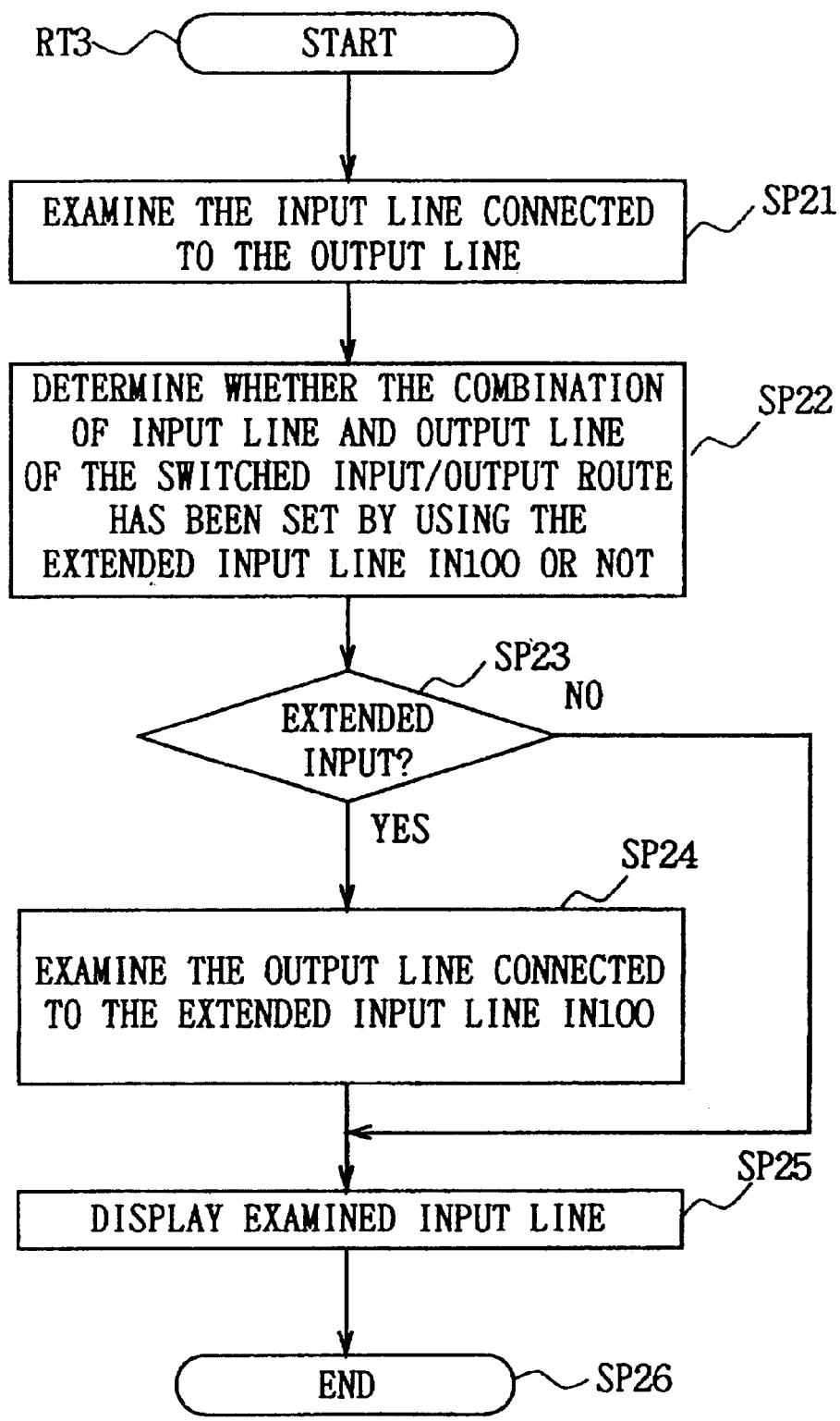
FIG. 18 is a flow chart illustrating a procedure for displaying input lines.

This remote control unit 206 displays the names of extended input lines in the extended routing switcher 204B which has been extended by connecting the main routing switcher 204A and the extended routing switcher 204B through the signal output signal line OUTL1 in accordance with a procedure RT3 for displaying input lines as illustrated in FIG. 18.

Specifically, in the procedure RT3 for displaying input lines, the remote control unit 206 proceeds to step SP21 when the user selects or specifies a desired selection button 17 on the control panel 25.

First, at step SP21, when the user depresses a desired selection button 17, the CPU 12 in the remote control unit 206 sends switching request data S1 representative of input/output lines corresponding to the selection button 17 to the control unit 2.

As a result, the control unit 2 generates route setting data D1 based on the switching request data S1, and supplies this to the routing switcher 203. This causes the routing switcher 203 to switch an input/output route based on the route setting data D1.

The routing switcher 203 sends set data when it switched the input/output route to each remote control unit 206 as route switching result data D2. Each remote control unit 206, upon receiving the route switching result data D2, examines an input line connected to the output line OUT100 through the CPU 12.

Next, at step SP22, the CPU 12 extends route setting data D20 read from the flash ROM 14 on the RAM 13, and determines on the basis of the route setting data D20 whether or not a combination of the input line examined at step SP21 and the output line has been set using the extended input line IN100.

Then, at next step SP23, the CPU 12 examines whether or not a combination of input/output lines exists corresponding to data set in the route setting data D20 (FIG. 15A) to determine whether or not the combination of the input line and the output line has been set using the extended input line IN100. If an affirmative result is returned, the CPU 12 proceeds to step SP24. Conversely, if a negative result is returned, the CPU 12 proceeds to step SP25.

Here, at step SP24, the CPU 12 examines an output line connected to the extended input line IN100 based on the route setting data D20 (FIG. 15A) extended on the RAM 13, and examines an input line (IN001–IN008) connected to the output line OUT001 based on the route setting data D20 (FIG. 16).

Then, at step SP25, the CPU 12 displays the examined input line by lighting a selection button 17 on the control panel 25 corresponding to the examined line number of the input line. In this way, the CPU 12 can immediately display the input line (or output line) corresponding to the crosspoint set in the routing switcher 203 by lighting the selection button 17 on the control panel 25.

Also, in the routing switcher 203, when the extended routing switcher 204B is connected to the main routing switcher 204A through the output signal line OUTL1, which is a single connection bus instead of a cascade connection, to additionally install input lines (IN001–IN008), an actually selected or specified input line IN001–IN008 can be identified by examining input/output routes, particularly, in the extended routing switcher 204B based on the route setting data D20.

Further, the CPU 12 in the remote control unit 206 lights a selection button 17 on the control panel 25 corresponding to an input line constituting an input/output route switched in accordance with the route setting data D20, thereby ensuring that the user can identify the line number of an extended input line selected or specified by the user.

Also, in this case, if an input/output route is switched to an input line in the main routing switcher 204A when an input line in the extended routing switcher 204B has been selected and displayed in accordance with input/output line switching result data S2, the CPU 12 in the remote control unit 206 updates the display from the input line in the extended routing switcher 204B to the input line in the main routing switcher 204A, and displays the latter.

Figure 19:
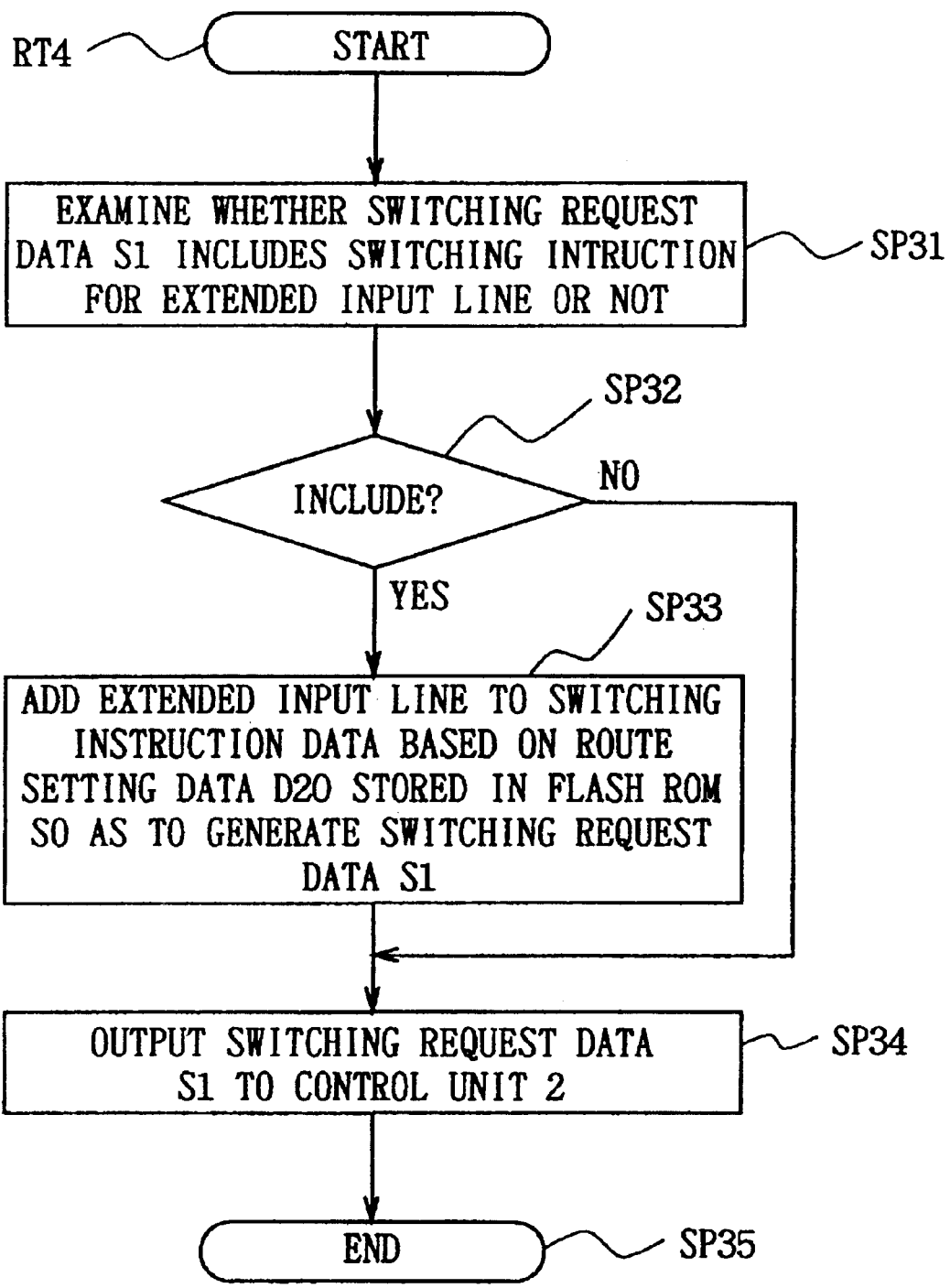
FIG. 19 is a flow chart illustrating a procedure for switching inputs.
Figure 20:
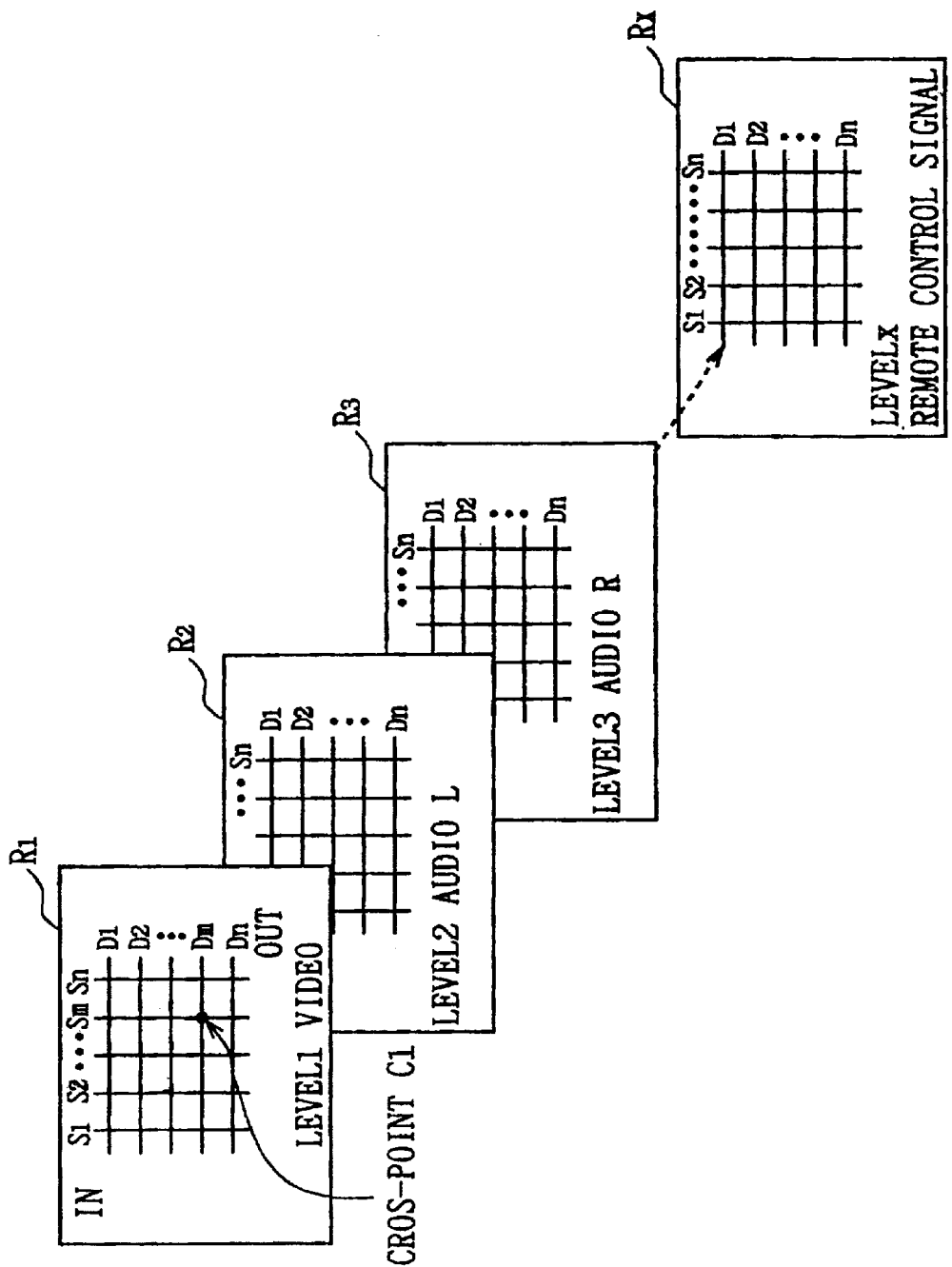
FIG. 20 is a schematic diagram illustrating the configuration of levels in routing switchers.

The input line switching processing in each routing switcher 203 is executed in accordance with an input switching procedure RT4 as illustrated in FIG. 19. Specifically, in the input switching procedure RT4, the remote control unit 206 proceeds to step SP31 when a desired selection button 17 is specified by the user on the control panel 25.

At step SP31, the CPU 12 in the remote control unit 206 first generates switching request data S1 in accordance with an output level associated with the specified selection button 17, and examines whether or not the switching request data S1 includes a switching instruction to an extended input line based on route setting data D20 read on the flash ROM 14.

At next step SP32, if the CPU 12 receives a determination result indicating that the switching request data S1 includes a switching instruction to an extended input line, the CPU 12 proceeds to next step SP33. As step SP33, the CPU 12 adds switching instruction data for selecting an extended input line to the route setting data D20, based on the route setting data D20 stored in the flash ROM 14, to generate switching request data S1.

At next step SP34, the CPU 12 sends the switching request data S1 having the switching instruction data added thereto and representing a cross-point for an input/output route to the control unit 2 through the S-bus 7.

Conversely, if the CPU 12 receives at step SP32 a determination result indicating that the switching request data S1 does not include a switching instruction data for selecting an extended input line, the CPU 12 immediately proceeds to step SP34, where the CPU 12 generates switching request data S1 for selecting only an input line in the main routing switcher 204A, and sends this to the control unit 2 through the S-bus 7.

At step SP35, the CPU 12 completes the procedure for switching an extended input line by selecting or specifying a selection button 17, thus terminating the input line switching processing.

With this processing, for requesting the routing switcher 203 to switch and set an input/output route, the remote control unit 206 can request the extended input line side to switch a cross-point based on the switching request data S1, which has been generated by adding the switching instruction data to the route setting data D20, when the switching request data S1 for performing a switching includes a switching instruction to an input line on the extended line side, i.e., in the extended routing switcher 204B.

Consequently, the remote control unit 206 can readily execute the switching and setting for an extended input for an extended input line in the extended routing switcher 204B which extends the main routing switcher 204A through the output signal line OUTL1 instead of a cascade connection (direct connection).

(3-3) Operation and Effect in Third Embodiment

In the foregoing configuration, the switcher apparatus 200 connects the extended input line IN100 of the main routing switcher 204A to the extended routing switcher 204B through the output signal line OUTL1.

With this connection, for switching an input line in the routing switcher 203 by the remote control unit 206, the switcher apparatus 200 adds switching instruction data to route setting data D20 to generate switching request data S1 for simultaneously performing the switching to the output line OUT100 and to the input line IN100, and sends this to the routing switcher 203, when an extended input line in the extended routing switcher 204B has been specified as an input line to be switched.

Consequently, the routing switcher 203 can readily execute the switching and setting based on the switching request data S1 for an extended line in the extended routing switcher 204B which extends the main routing switcher 204A through the output signal line OUTL1.

Also, when a desired input line is selected for a desired output line and is switched and set, the switcher apparatus 200 determines whether the selected desired input line is an input line in the main routing switcher 204A or in the extended routing switcher 204B by examining a setting state of an input/output route in the routing switcher 203 based on route switching result data D2 by the remote control unit 206, and lights a selection button 17 on the control panel 25 corresponding to the determined input line.

In this way, by displaying an output line and a desired input line switched to the output line through selection buttons 17 lit on the control panel 25, the switching apparatus 200 enables the user to readily recognize a combination of a set input/output route.

In this event, selection buttons 17 corresponding to all input lines in the main routing switcher 204A and the extended routing switcher 204B can be displayed on the control panel 25 of the remote control unit 206, so that if a previously selected input line in the extended routing switcher 204B is switched to an input line in the main routing switcher 204A, the switcher apparatus 200 can immediately switch the light display to a selection button 17 corresponding to the switched input line.

According to the configuration described above, the switcher apparatus 200 connects the extended input line IN100 of the main routing switcher 204A to the extended routing switcher 204B through the output signal line OUTL1, such that an input line to be switched to the output line OUT100 can be freely set not only in the main routing switcher 204A but also extensively in the extended routing switcher 204B under the control of the remote control unit 206, thereby making it possible to readily execute the control for switching an input/output route in the main routing switcher 204A and the extended routing switcher 204B.

(4) Other Embodiments

While the aforementioned first embodiment has been described for the case where the switcher apparatus 1 utilizes the routing switcher 3 organized of 4×4 input/output lines, the present invention is not limited to this, but may employ a routing switcher organized of 8×8 input/output lines depending on the number of apparatus used in editing operations, types of signals, and so on. In this case, when normal control levels are set in a matrix range A comprising IN1, IN2 and OUT1, OUT2, a matrix range B comprising IN3, IN4 and OUT3, OUT4, a matrix range C comprising IN5, IN6 and OUT5, OUT6, and a matrix range D comprising IN7, IN8 and OUT7, OUT8 may be set as extended levels, thereby making it possible to increase extended levels in any way depending on how to set a matrix range.

Also, the aforementioned first embodiment has been described for the case where offset data "IN3, OUT3" and selected matrix range information indicative of desired input lines and output lines selected from the area of the matrix range B on and after the offset data "IN3, OUT3" have been previously stored in the flash ROM 14 serving as storage means. The present invention, however, is not limited to this. Alternatively, a recording medium such as an optical disk or the like, on which the offset data "IN3, OUT3" and the selected matrix range information have been recorded, may be read through an external reading device of a computer or the like, such that the read data and information may be extended on the RAM 13 by the CPU 12, serving as control means for each remote control unit 7, to set extended levels. This enables an existing switcher apparatus 1 to readily set extended levels only by reading the data from a predetermined recording medium, in which case similar effects to those in the aforementioned first embodiment can be provided.

Further, while the aforementioned second embodiment has been described for the case where the names of input lines and output lines are represented by types (IN or OUT) and line numbers, the present invention is not limited to this. For example, when an output destination is a VTR, the type indicative of the name may be displayed including the name of an input source such as a VTR or the like included therein.

Further, while the second embodiment has been described for the case where range setting data D10 has been previously stored in the flash ROM 14, the present invention is not limited to this. Alternatively, the range setting data D10 may be stored on a recording medium such as an optical disk or the like and read through an external reading device of a computer or the like, such that the read data may be extended on the RAM 13 by the CPU 12, serving as an input/output range setting unit for each remote control unit 106, to set an input/output line use range, input lines with limited use for output lines may be displayed by the CPU 12 serving as a signal route setting unit and the display unit 10B, and the display may be switched to input lines with limited use for a predetermined output line. This enables even an existing switcher apparatus 100 to readily set a use range for input/output lines only by reading the data from a predetermined recording medium, in which case similar effects to those in the aforementioned embodiment can be provided.

Further, while the aforementioned third embodiment has been described for the case where input lines are extended by connecting the main routing switcher 204A as a main switcher to the extended routing switcher 204B as an extended switcher through the S-bus 7 as a connection bus, the present invention is not limited to this, but may be applied to an extension of output lines in the main routing switcher 204A. In this case, output lines can be set for predetermined input lines with route setting data as shown in FIG. 15B.

Further, while the aforementioned third embodiment has been described for the case where a signal input/output route is switched by the main routing switcher 204A and the extended routing switcher 204B, each formed of a matrix-shaped switcher, the present invention is not limited to this, but a signal input/output route may be switched by ring-shaped main routing switcher and extended routing switcher.

Further, while the aforementioned third embodiment has been described for the case where route setting data D20 has been stored in the flash ROM 14, the present invention is not limited to this. Alternatively, the route setting data D20 may be stored on a recording medium such as an optical disk or the like and read through an external reading device of a computer or the like, such that the data may be extended on the RAM 13 by the CPU 12, serving as a setting unit and as a switching control unit for each remote control unit 6, to set extended inputs for the routing switcher 3. This enables even an existing switcher apparatus 200 to readily set extended input lines for the routing switcher 203 only by reading the data from a predetermined recording medium, in which case similar effects to those in the aforementioned embodiment can be provided.

Further, while the third embodiment has been described for the case where one stage of extended routing switcher 204B is connected to the main routing switcher 204A, the present invention is not limited to this, and a plurality of stages of extended routing switchers may be connected to the main routing switcher.

Industrial Availability

The switcher apparatus and input/output switching method of the present invention is applied to a routing switcher for switching an input/output route for a signal outputted from a predetermined signal source, for example, in a broadcasting station to deliver the signal to a desired output destination.

What is claimed is:

1. A switcher apparatus characterized by comprising:

a matrix-shaped switcher, including a group of a plurality of cross-points at which a plurality of input lines and a plurality of output lines intersect with each other, for switching an input/output route for a signal by switching a connection of said cross-point within a predetermined matrix range composed of a predetermined input lines and output lines within said pluralities of input lines and output lines;

storage means for storing unused matrix range information indicative of unused input lines and output lines except for said predetermined matrix range within said plurality of input lines and said plurality of output lines, and selected matrix range information indicative of input lines and output lines selected from said unused matrix range; and control means for setting a new matrix range from said unused matrix range based on said unused matrix range information and said selected matrix range information.

2. The switcher apparatus according to claim 1, characterized in that:

when said cross-point is specified within said predetermined matrix range, said control means switches the input/output route for said signal based on the address of said specified cross-point, and switches a connection of a cross-point in said new matrix range corresponding to the address of said cross-point in association with a switching control within said predetermined matrix range to switch an input/output route for a new signal different from the type of said signal.

3. The switcher apparatus according to claim 2, characterized in that:

said control means, after switching the input/output route for said new signal within said new matrix range, examines the type of said new signal inputted to the switched input line, and thereafter displays the type of said signal together with the number of the input line connected to said cross-point specified within said predetermined matrix range.

4. An input/output switching method for switching an input/output route for a signal in a matrix-shaped switcher, including a group of a plurality of cross-points at which a plurality of input lines and a plurality of output lines intersect with each other, by switching connections of said cross-points within a predetermined matrix range composed of a predetermined input lines and output lines within said pluralities of input lines and output lines, said input/output switching method characterized by comprising:

a first step of reading from storage means unused matrix range information indicative of unused input lines and output lines except for said predetermined matrix range within said plurality of input lines and said plurality of output lines, and selected matrix range information indicative of selected input lines and output lines selected from said unused matrix range; and a second step of setting a new matrix range from said unused matrix range based on said unused matrix range information and said selected matrix range information.

5. The input/output switching method according to claim 4, characterized by comprising:

a third step, subsequent to said second step, of switching, when said cross-point is specified within said predetermined matrix range, the input/output route for said signal based on the address of said specified cross-point, and switching a connection of a cross-point in said new matrix range corresponding to the address of said cross-point in association with a switching control within said predetermined matrix range to switch an input/output route for a new signal different from the type of said signal.

6. The input/output switching method according to claim 5, characterized by comprising:

after switching the input/output route for said new signal within said new matrix range, a fourth step, subsequent to said third step, of examining the type of said new signal inputted to said switched input line, and thereafter displaying in display means the type of said signal together with the number of an input line connected to said cross-point specified within said predetermined matrix range.

* * * * *